United States Patent [19]

Hahn

[11] Patent Number: 4,590,573
[45] Date of Patent: May 20, 1986

[54] COMPUTER-CONTROLLED GRINDING MACHINE

[76] Inventor: Robert Hahn, 26 Rice Ave., Northboro, Mass. 01532

[21] Appl. No.: 419,319

[22] Filed: Sep. 17, 1982

[51] Int. Cl.⁴ ............ G05B 19/18; G06F 15/46; B24B 51/00
[52] U.S. Cl. ............ 364/474; 364/167; 364/171; 318/567; 51/165.71
[58] Field of Search ........... 364/167, 171, 188–190, 364/194, 474–475; 318/567–569, 571; 408/8–13; 51/2 D, 2 F, 2 G, 88–89, 95 WH, 95 TG, 132, 134.5 R, 154, 161, 165.71, 165.75, 165.87, 260–261, 288

[56] References Cited

U.S. PATENT DOCUMENTS

| | | | |
|---|---|---|---|
| 3,327,432 | 6/1967 | Lockwood | 51/165 |
| 3,589,077 | 6/1971 | Lenning | 51/165 |
| 3,634,976 | 1/1972 | Hahn | 51/165 |
| 3,699,720 | 10/1972 | Lenning | 51/165 |
| 3,796,012 | 3/1974 | Uhtenwoldt | 51/165.77 |
| 3,817,647 | 6/1974 | Lemelson | 408/8 |
| 3,913,277 | 10/1975 | Hahn et al. | 51/165 |
| 3,964,210 | 6/1976 | Moritomo | 51/165.71 |
| 4,058,711 | 11/1977 | Ondercin | 364/101 |
| 4,170,851 | 10/1979 | Enos | 51/165.71 |
| 4,293,913 | 10/1981 | Nishimura et al. | 364/474 |
| 4,366,543 | 12/1982 | Feller et al. | 364/474 |
| 4,382,215 | 5/1983 | Barlow et al. | 318/568 |
| 4,393,449 | 7/1983 | Takeda et al. | 364/474 |
| 4,400,781 | 8/1983 | Hotta et al. | 364/474 |
| 4,401,930 | 8/1983 | Kato et al. | 364/474 |
| 4,408,280 | 10/1983 | Bedini et al. | 364/474 |
| 4,428,055 | 1/1984 | Kelley et al. | 364/474 |

OTHER PUBLICATIONS

Worcester Evening Gazette, Jan. 12, 1973, p. 48A—"Warner & Swasey on Overtime".
American Metal Market, Jul. 26, 1976—pp. 9 & 11—"2 Computerized Grinding Machines".

Primary Examiner—Gary V. Harkcom
Attorney, Agent, or Firm—Blodgett & Blodgett

[57] ABSTRACT

Grinding machine for finishing a surface of revolution on a workpiece, comprising a computer-controlled program bringing about a rounding-up operation at creep speed by spindle deflection compensation. A sensor is provided that generates an analog electrical signal indicative of the grinding force between the wheel and the workpiece, including a converter for changing the electrical signal to a digital signal. A digital computer is connected to the sensor and also to the actuator for the transmittal of signals therebetween for the regulation of the operation of the actuator. The control device includes apparatus for the measurement of system rigidity and for using this measurement to control the actuator.

14 Claims, 33 Drawing Figures

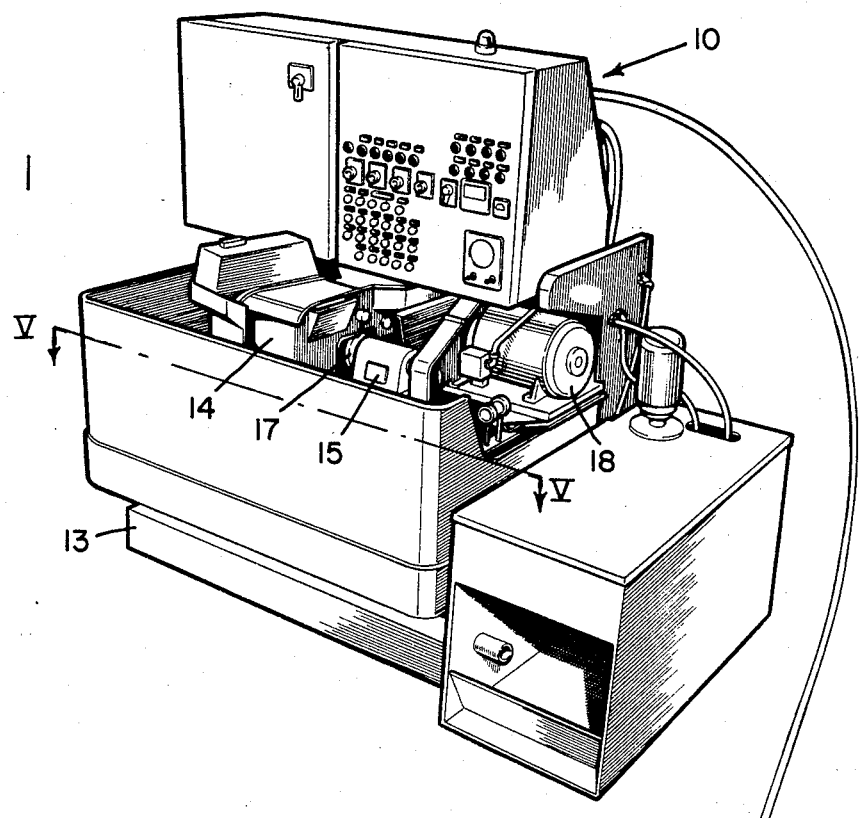
FIG. 1
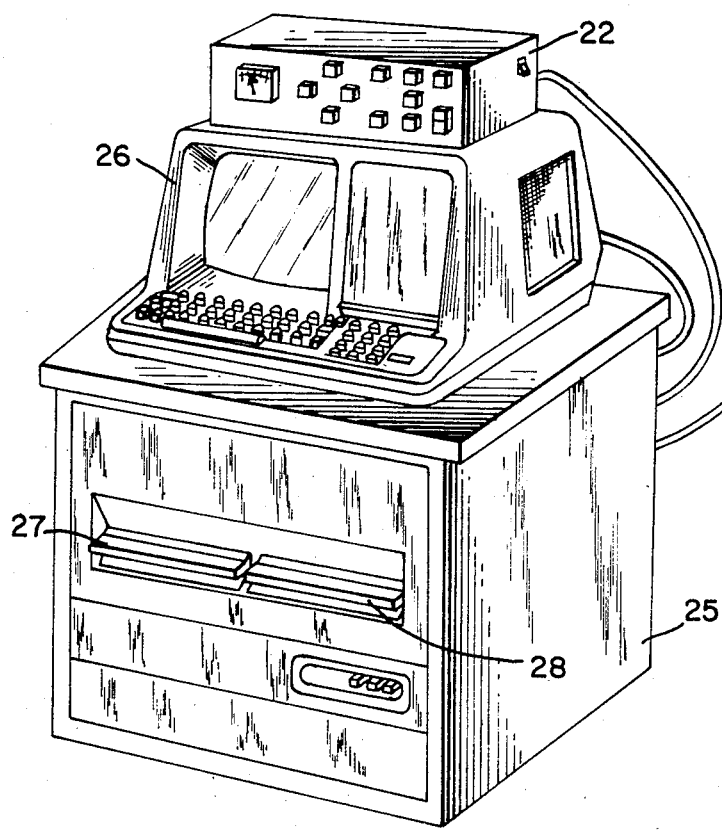

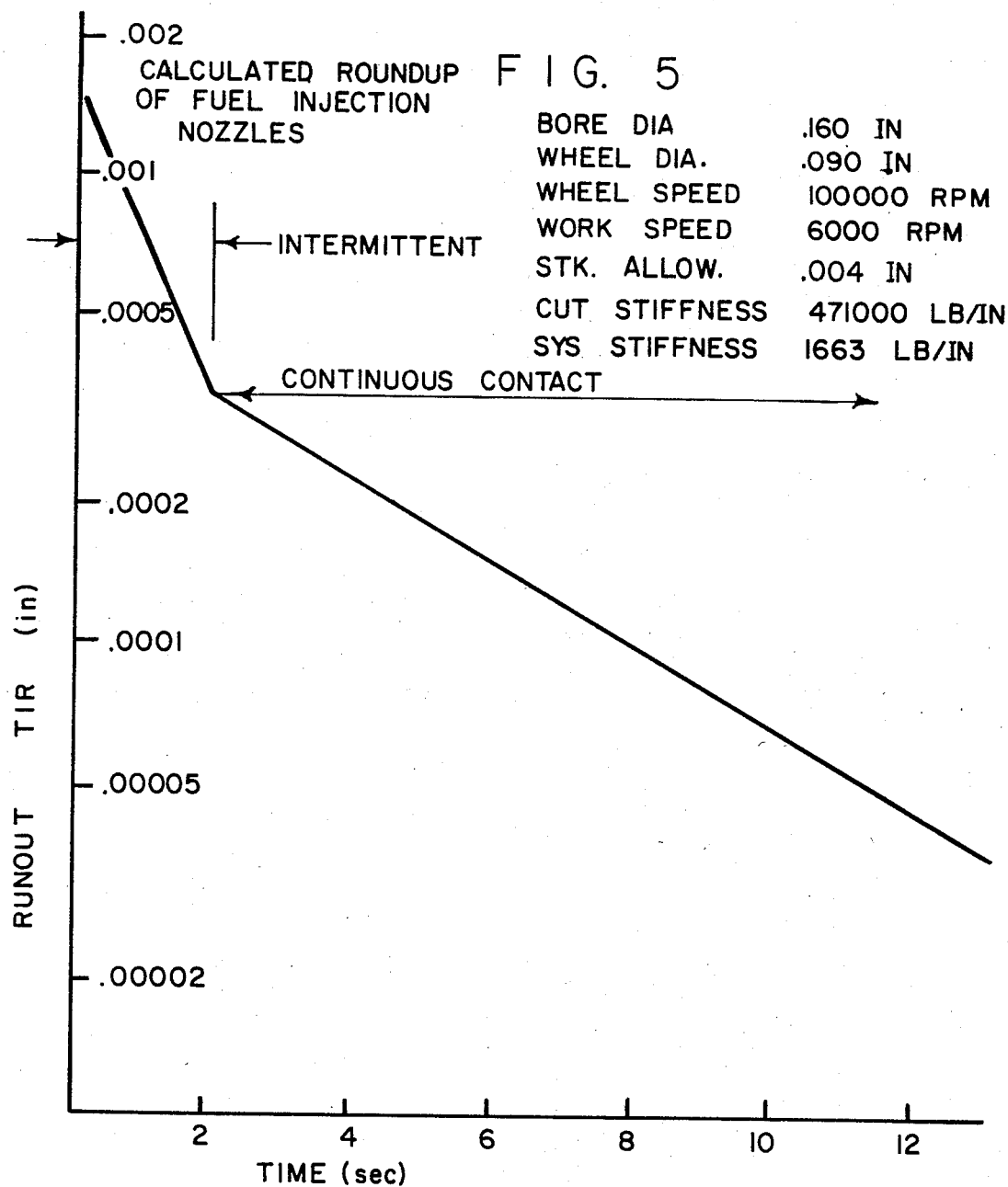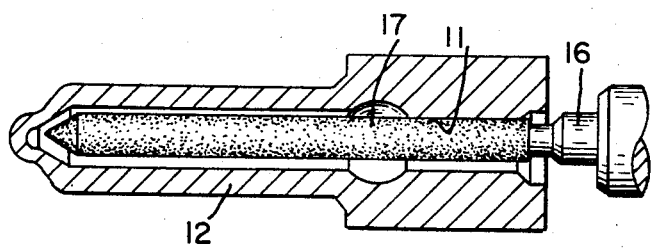

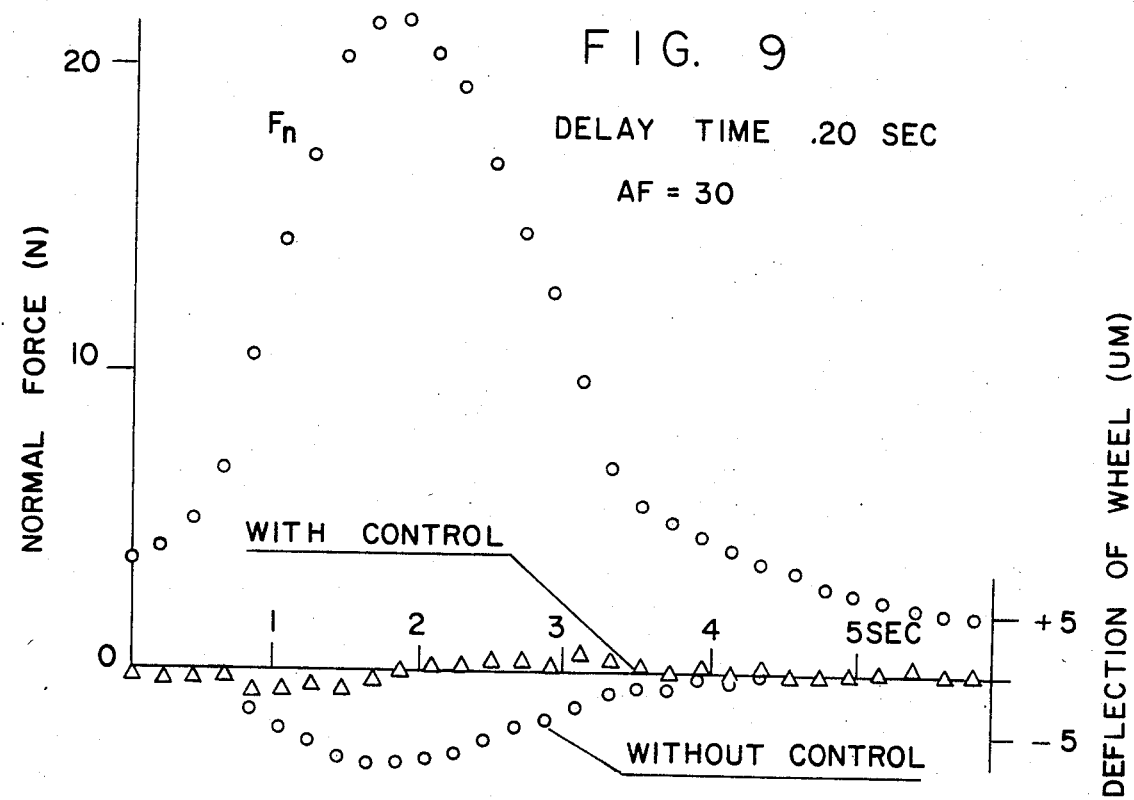
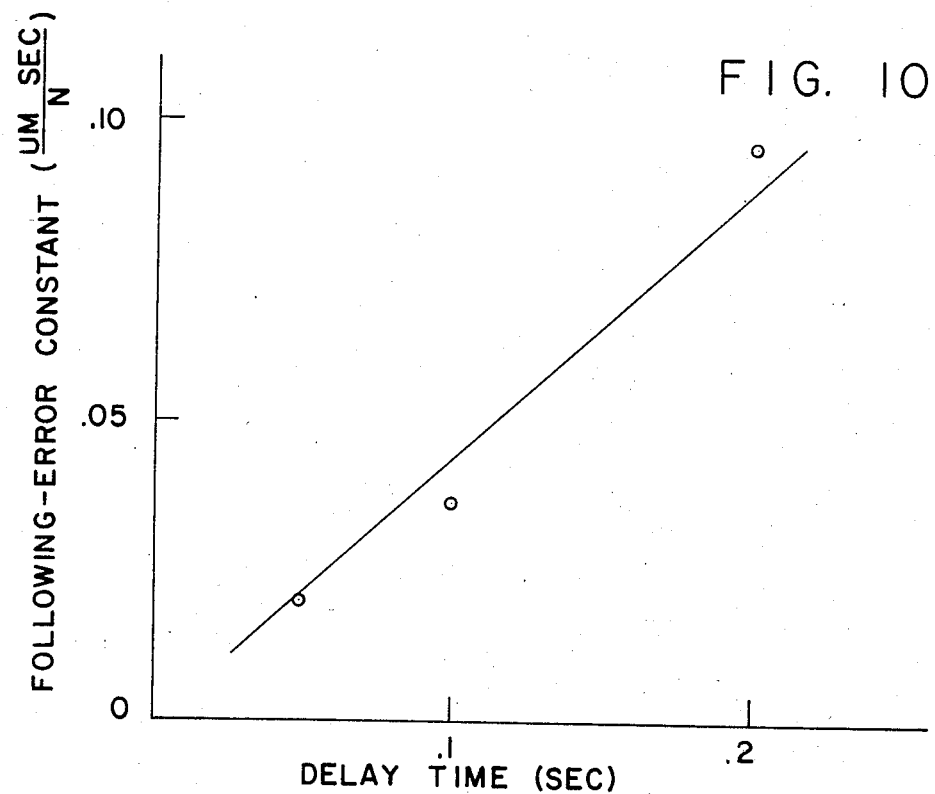

FIG. 16
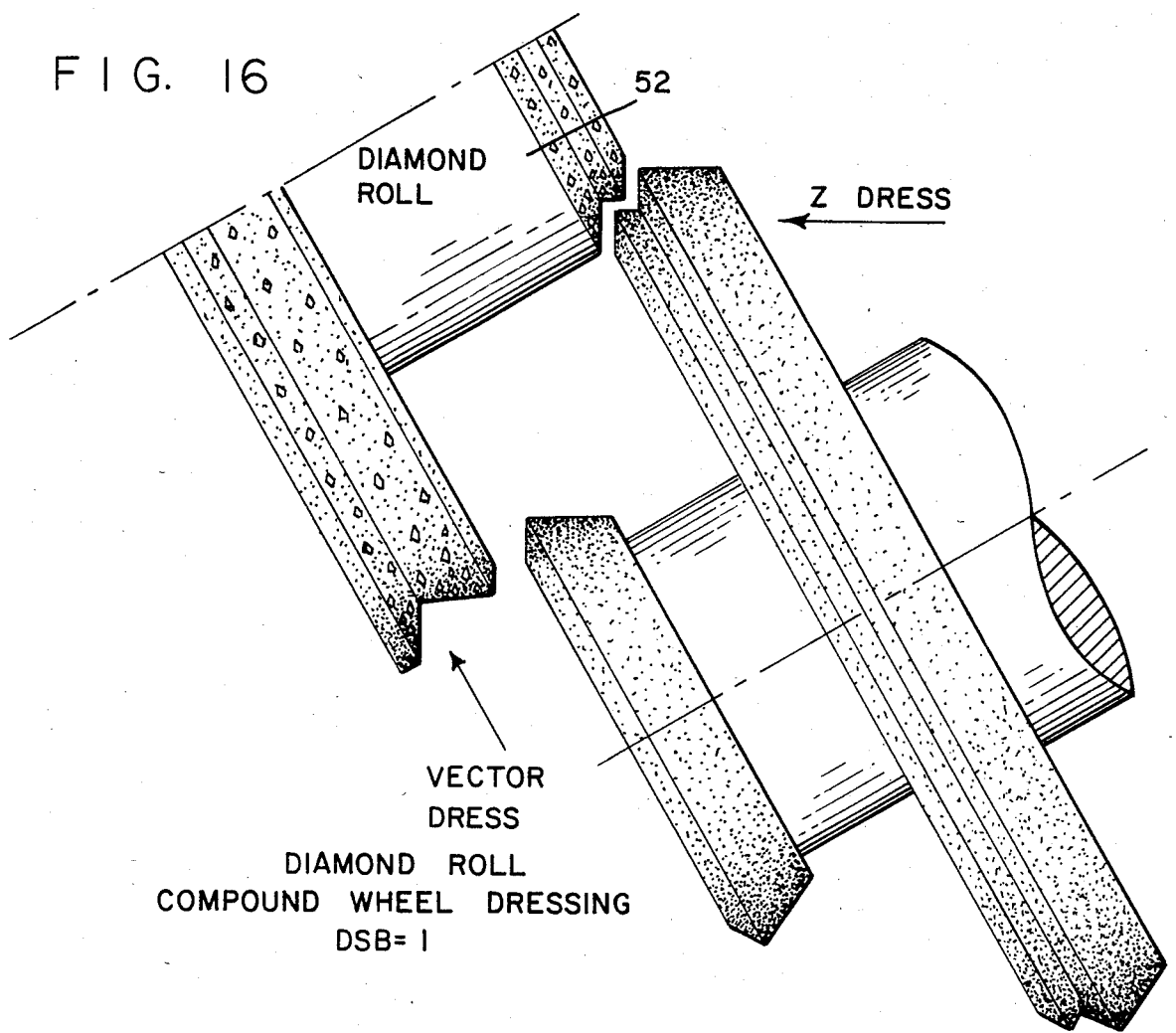
VECTOR DRESS
DIAMOND ROLL COMPOUND WHEEL DRESSING
DSB= 1
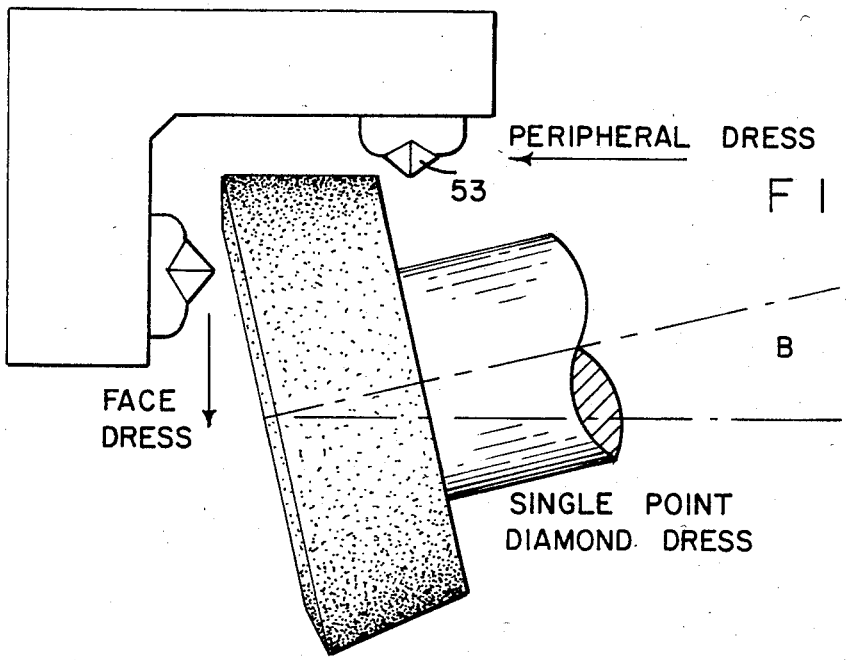
FIG. 17

FIG. 30

$$D_e = \frac{D_w D_s}{D_w \pm D_s} \tag{1}$$

$$Z_w = \Lambda_w (F_n - F_{th}) \tag{2}$$

$$\pi D_w W \bar{v}_w = \Lambda_w (F_n - F_{th}) \tag{3}$$

$$\bar{v}_w = \frac{\Lambda_w}{\pi D_w} (F'_n - F'_{th}) \tag{4}$$

$$h = \frac{\bar{v}_w}{N_w} = \frac{\Lambda_w}{\pi D_w N_w} (F'_n - F'_{th}) \tag{5}$$

$$K_c = \frac{dF_n}{dh} = \frac{V_w W}{\Lambda_w} \tag{6}$$

$$\alpha = \frac{K_c}{K_s} \tag{7}$$

$$DX = \frac{-AF}{100} \left(\frac{K_c + K_s}{K_s}\right) DZ \tag{8}$$

$$P_{i+1} = P_i - (h_2 - h_1) \tag{9}$$

$$h_1 = \frac{F_1}{K_c} \quad \text{and} \quad h_2 = \frac{F_2}{K_c} \tag{10}$$

$$h_1 + \frac{F_1}{K_s} = d_1 \tag{11}$$

$$h_2 + \frac{F_2}{K_s} = d_1 + P_i \tag{12}$$

$$h_2 - h_1 = \frac{K_s}{K_s + K_c} P_i \tag{13}$$

$$P_{i+1} = \frac{K_c}{K_c + K_s} P_i \tag{14}$$

$$P_n = \left|\frac{K_c}{K_c + K_s}\right|^n P_o \tag{15}$$

$$n = \frac{\log \frac{P_o}{P_n}}{\log \frac{K_c + K_s}{K_c}} \tag{16}$$

FIG. 31

$$t = \frac{1}{N_w} \frac{\log \frac{\rho_o}{\rho_n}}{\log \frac{K_c + K_s}{K_c}} \quad (17)$$

$$Z''_w = \Lambda_w (\sigma_n - \sigma_{th}) \quad (18)$$

$$Z''_w = V_w \sin \theta \quad (19)$$

$$\sigma_n = \frac{V_w \sin \theta}{\Lambda_w} + \sigma_{th} \quad (20)$$

$$\sigma_t = \mu \sigma_n \quad (21)$$

$$dF_n = \sigma_n w \frac{D_s}{2} d\theta \quad (22)$$

$$dF_n = \frac{wD_s}{2} \left[ \frac{V_w \sin \theta}{\Lambda_w} + \sigma_{th} \right] d\theta \quad (23)$$

$$dF_t = \mu \sigma_n \frac{wD_s}{2} d\theta \quad (24)$$

$$dF_t = \frac{\mu wD_s}{2} \left[ \frac{V_w \sin \theta}{\Lambda_w} + \sigma_{th} \right] d\theta \quad (25)$$

$$dF_y = dF_n \cos\theta \pm dF_t \sin\theta \quad (26)$$

$$dF_x = dF_n \sin\theta \pm dF_t \cos\theta \quad (27)$$

$$\theta_o = \cos^{-1}(1 - \frac{2h}{D_s}) \quad (28)$$

$$F_y = \frac{wD_s}{2} \left[ \frac{V_w}{\Lambda_w} \sin^2\theta_o + \sigma_{th} \sin\theta_o \right]$$
$$\pm \frac{\mu wD_s}{2} \left[ \frac{V_w}{\Lambda_w} (\frac{\theta_o}{2} - \frac{\sin\theta_o \cos\theta_o}{2}) - \sigma_{th}(\cos\theta_o - 1) \right] \quad (29)$$

$$F_x = \frac{wD_s}{2} \left[ \frac{V_w}{2\Lambda_w} (\theta_o - \sin\theta_o \cos\theta_o) + \sigma_{th}(1 - \cos\theta_o) \right]$$
$$\pm \frac{\mu wD_s}{2} \left[ \frac{V_w \sin^2\theta_o}{2\Lambda_w} + \sigma_{th} \sin\theta_o \right] \quad (30)$$

$$dT = \frac{D_s}{2} dF_t \quad (31)$$

$$T = \mu\left(\frac{D_s}{2}\right)^2 w \int_0^{\theta_0} \left[\frac{V_w \sin\theta}{\Lambda_w} + \sigma_{th}\right] d\theta \qquad (31a)$$

$$= \frac{\mu D_s^2}{4} w \left[\frac{V_w(1-\cos\theta_0)}{\Lambda_w} + \sigma_{th}\theta_0\right] \qquad (32)$$

$$\cos\theta_0 = 1 - \frac{2h}{D_s} \qquad (32a)$$

$$1 - \frac{\theta_0^2}{2!} + \cdots = 1 - \frac{2h}{D_s} \qquad (32b)$$

$$\theta_0 = 2\sqrt{\frac{h}{D_s}} \quad \text{and} \quad \sin\theta_0 = \theta_0 \qquad (33)$$

$$F_y = wD_s\left[\frac{V_w h}{\Lambda_w D_s} + \sigma_{th}\sqrt{\frac{h}{D_s}}\right] \qquad (34)$$

$$F_y = \frac{wV_w}{\Lambda_w} h \qquad (35)$$

$$K_c = \frac{wV_w}{\Lambda_w} \qquad (36)$$

$$h = \frac{F_y}{K_c} \qquad (37)$$

$$Z_w = wV_w \frac{F_y}{K_c} = \Lambda_w F_y \qquad (38)$$

$$\Delta = \frac{2}{D_s} \pm \frac{2}{D_w} \qquad (39)$$

$$\Delta_i = \frac{2}{D_s}\left[\frac{\left(\frac{D_w}{D_s}-1\right)\left(\frac{D_w}{D_s}+2\frac{N_s}{N_w}\right)}{\left(\frac{D_w}{D_s}+\frac{N_s}{N_w}\right)^2}\right] \qquad (40)$$

FIG. 32

NOMENCLATURE

FIG. 33

| | | |
|---|---|---|
| $N_s$ | = | wheel rotational speed |
| $N_w$ | = | work rotational speed |
| $D_w$ | = | work diameter |
| $D_s$ | = | wheel diameter |
| $D_e$ | = | "Equivalent Diameter" |
| $Z_w$ | = | Volumetric Stock Removal Rate |
| $Z_w''$ | = | Stock Removal Rate per unit area |
| $\Lambda_w$ | = | Work Removal Parameter |
| $F_n$ | = | Normal Force |
| $F_n'$ | = | Normal Force per unit width |
| $F_{th}$ | = | Threshold Force |
| $w$ | = | width of contact |
| $\bar{v}_w$ | = | rate of change of work radius |
| $h$ | = | wheel depth of cut |
| $K_c$ | = | cutting stiffness |
| $V_w$ | = | work surface speed |
| $K_s$ | = | system stiffness |
| $\rho_i$ | = | workpiece runout |
| $\sigma_n$ | = | normal stress on wheel |
| $\sigma_t$ | = | tangential stress on wheel |
| $\sigma_{th}$ | = | normal stress threshold |
| $T$ | = | grinding torque |
| $\mu$ | = | effective friction coefficient |
| $\Delta_i$ | = | curvature difference for internal grinding |

COMPUTER-CONTROLLED GRINDING MACHINE

BACKGROUND OF THE INVENTION

In the operation of automatic grinding machines there are a number of problems that arise which limit production rate and quality of the produced workpieces. One problem is that of "rounding-up" irregular or eccentric stock on machines of low rigidity where the grinding wheel tends to follow original workpiece runout errors. As the workpiece moves by the grinding wheel, variations in the depth of the stock cause the wheel to deflect. This causes the grinding force to vary, resulting in different rates of grinding and a slow rounding-up action results. These problems are evident in cylindrical grinding, particularly when the wheel or workpiece is not rigidly supported. Furthermore, some workpieces exhibit a threshold force below which no cutting takes place, so that rounding-up action ceases if the grinding force drops below this value. These and other difficulties experienced with the prior art devices have been obviated in a novel manner by the present invention.

SUMMARY OF THE INVENTION

In general, the invention consists of a grinding machine for finishing a surface of revolution on a workpiece, the machine consisting of a base, a workhead mounted on the base for supporting the workpiece and rotating it about the axis of the surface of revolution, and a wheelhead mounted on the base and having a rotatable spindle which is adapted to carry an abrasive wheel. Feed means is provided to bring about relative movement between the wheelhead and the workpiece, the feed means including an actuator capable of regulating the distance between the wheelhead and the workhead. Control means is provided which operates through the actuator to vary the relative positions of the wheelhead and the workhead to maintain the operative surface of the wheel at a predetermined position relative to the axis of the workpiece during a given revolution of the workpiece at creep speed to enhance a rounding-up operation.

More specifically, a sensor is provided that generates an analog electrical signal indicative of the grinding force between the wheel and the workpiece, including a converter for changing the electrical signal to a digital signal. A digital computer is connected to the sensor (and also to) the actuator for the transmittal of signals therebetween for the regulation of the operation of the actuator. The control means includes apparatus for the measurement of system rigidity and for using this measurement to control the actuator.

In addition, the computer contains a logic program which causes the computer to actuate the feed means to advance the abrasive wheel toward the surface of the workpiece, while the workhead is rotating at high speed, until the signal from the sensor indicates that contact is continuous. The program contains a routine that then causes the computer to determine if the said surface of the workpiece is out-of-round; if it is out-of-round, the computer enters a routine that changes the workhead rotation to a low speed for creep grinding. The program then progresses into a roundup routine, including a sub-routine that causes the feed means to move the wheelhead toward or away from the said surface in accordance with an equation that specifies the distance for the actuator to move in order to prevent wheel deflection. This distance is equal to the attenuation factor divided by 100, multiplied by the cutting stiffness plus the system rigidity divided by the cutting stiffness and multiplied by the incremental change in distance from the axis of the workpiece before the routine was begun.

It is, therefore, an outstanding object of the invention to provide a grinding machine controlled by a computer, containing a program serving to grind a workpiece to predetermined specifications without experimentation on the part of the operator.

Another object of this invention is the provision of a grinding machine in which a rounding-up operation takes Place automatically.

A further object of the present invention is the provision of a grinding machine in which cross feed during a rounding-up operation is under the control of a computer having a program for that purpose.

It is another object of the instant invention to providing a grinding machine having a digital computer to provide control from point-to-point in the grinding cycle and performing calculations of grinding parameters at closely-spaced points in the grinding process to make readjustment if necessary in the grinding operation.

A still further object of the invention is the provision of a grinding machine whose controls incorporate a digital computer with an input-output console which permits communication between the operator and the controls.

It is a further object of the invention to provide a grinding machine having as its control element a digital computer which receives information and instructions from the operator from time-to-time and which occasionally asks the operator for information.

It is a still further object of the present invention to provide a grinding machine having as its control element a digital computer with a readout for instructing the operator on occasion to perform certain manipulations.

With these and other objects in view, as will be apparent to those skilled in the art, the invention resides in the combination of parts set forth in the specification and covered by the claims appended hereto.

BRIEF DESCRIPTION OF THE DRAWINGS

The character of the invention, however, may be best understood by reference to one of its structural forms, as illustrated by the accompanying drawings, in which:

FIG. 1 is a perspective view of a grinding machine embodying the principles of the present invention, FIG. 5 is a graph of the relationship between time and runout in connection with the typical workpiece operation, FIG. 6 is a vertical sectional view of a typical workpiece being ground on the grinding machine, FIGS. 7, 8, and 9 show the wheel deflection with and without computer control when the wheel is subjected to a force pulse, FIG. 10 shows the relationship between the following-error constant and delay time, FIG. 16 is a plan view of a wheel and a dressing apparatus in a typical grinding situation, FIG. 17 is a plan view of the dressing operation of an abrasive wheel in another typical grinding situation, FIG. 33 is a list of the nomenclature used.

DESCRIPTION OF THE PREFERRED EMBODIMENT

Figure 2:
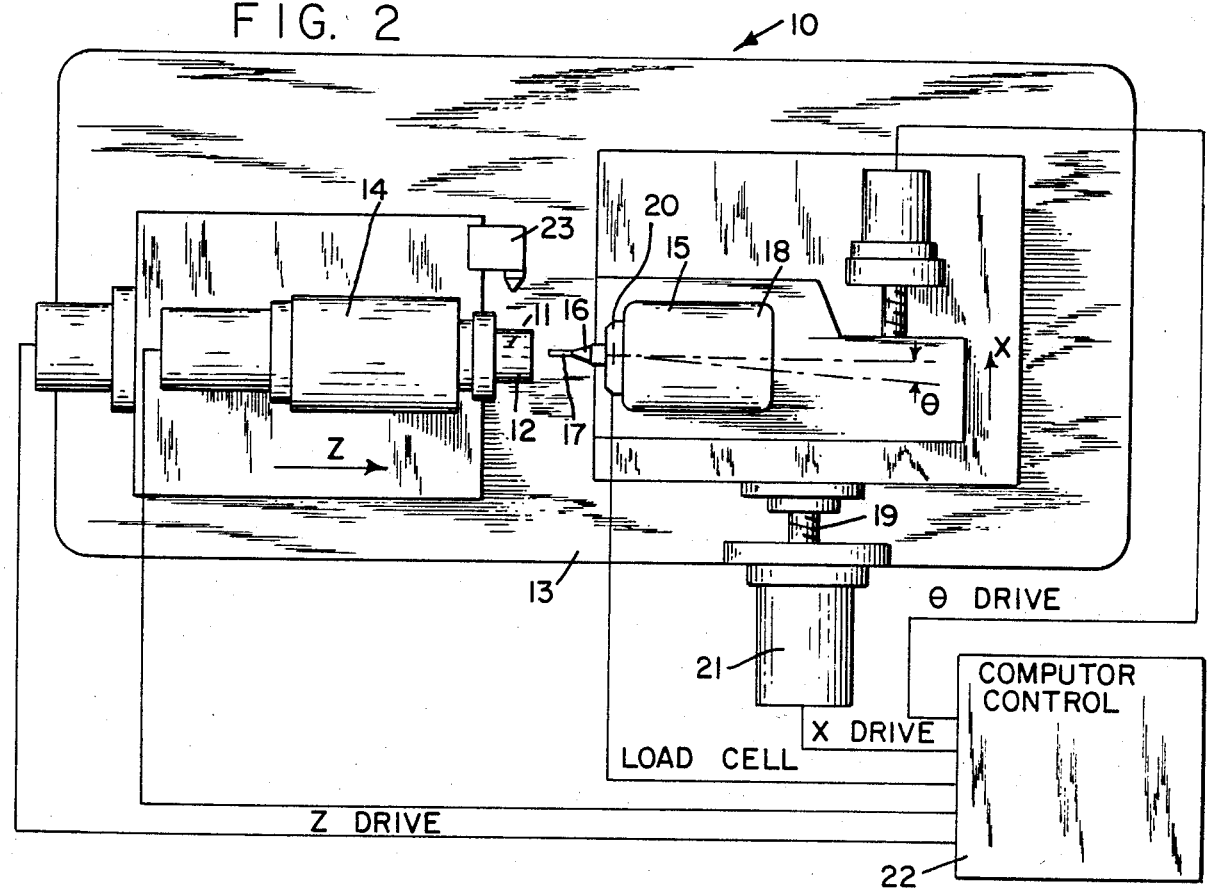
FIG. 2 is a schematic plan view of the grinding machine.

Referring first to FIGS. 1 and 2, wherein are best shown the general features of the invention, the grinding machine, indicated generally by the reference numeral 10, is shown finishing a surface 11 of revolution on a workpiece 12. The grinding machine is provided with a base 13 on which is mounted a workhead 14 supporting the workpiece 12 and rotating it about the axis of the surface 11. A wheelhead 15 is mounted on the base and has a rotatable spindle 16 which is adapted to carry an abrasive wheel 17 and has a motor 18 for rotating the spindle. A feed means 19 is provided to bring about relative movement between the wheelhead 15 and the workhead 14 to produce a grinding cycle between the abrasive wheel 17 and the workpiece 12. The feed means 19 includes an actuator 21 which is capable of regulating the distance between the wheelhead and the workhead. A control means 22 is provided which operates through the actuator 21 to vary the relative positions of the workhead and the wheelhead. Among other functions, the control means serves to maintain the operative surface of the wheel at a predetermined position relative to the axis of the workpiece during a given revolution of the workpiece to enhance a rounding-up operation in a creep feed mode.

Referring to FIG. 6, it can be seen that the surface of revolution 11 to be finished is an internal bore of small diameter and great length including the tapered seat, the spindle 16 and the wheel 17 having similarly small diameters and long lengths.

As is evident in FIG. 2, a sensor 20 is provided for generating an analog electrical signal which is indicative of the grinding force between the wheel and the workpiece. A converter is provided for changing the analog signal to a digital signal. A digital computer 25 is connected to the sensor, the computer being connected to the actuator 21 for the transmittal of signals therebetween for the regulation of the operation of the actuator.

The control means 22 includes apparatus for the measurement of system rigidity $K_s$ and using this measurement to control the actuator 21, the system rigidity being measured under rotating conditions. A dressing apparatus 23 is provided as well as means operative at a predetermined point in the grinding cycle to measure the sharpness of the wheel and to use this value to control the feed means actuator 21. Wheel sharpness is measured at other times in other cycles and compared with the sharpness of a freshly-dressed wheel for making a decision as to performing a dressing operation. Means is also provided that is operative when a new wheel is mounted on the spindle to produce a special dressing cycle. A CRT console 26, a floppy disk reader 27 (system disk), and a floppy disk reader 28 (grinding program disk) is provided for communicating with the computer 25 by sending and receiving electrical pulses arranged in accordance with ASCII code.

Referring to FIGS. 21–29, the computer 25 contains a program 40 for regulating the feed means 19 in such a way that the operative surface of the wheel is maintained at a predetermined position during a given revolution of the workpiece to enhance a rounding-up operation. The program 40 contains a routine 41 that causes the computer to actuate the feed means 19 to advance the abrasive wheel 17 toward the surface of the workpiece while the workhead is rotating at high speed. The advance takes place until the signal from the sensor 20 indicates that contact is continuous. The program contains a routine 42 that then causes the computer to determine if the surface of the workpiece is out-of-round. If it is out-of-round, the computer enters a routine 43 that changes the workhead rotation to a low speed for creep grinding and to progress into a round-up routine 44 (see FIG. 25). The round-up routine includes a subroutine 45 (see FIG. 26) that causes the feed means to move the wheelhead toward or away from the surface of the workpiece in accordance with Equation (8) in FIG. 30, where $Dx(J)$ is the amount of movement, AF is the attenuation factor, K is the cutting stiffness and $K_s$ is the system rigidity.

The signal from the sensor 20 (which is representative of the normal force between the wheel and the workpiece) is transferred from time-to-time from the sensor to the computer in which a sub-routine 46 determines the maximum and minimum forces. The difference between the maximum and minimum forces is determined during each rotation of the workpiece and a rounded-up condition is indicated at 47 and 48 when the difference is reduced to a predetermined value. The diameter of the surface of revolution is determined and, if a predetermined first size is reached before the said rounded-up condition is indicated, the program terminates the grinding operation.

The operation and advantages of the present invention will now be readily understood in view of the above description. In the production grinding of small holes, such as the passage in fuel-injection nozzles, the operation is seriously limited, because of the low rigidity of the small diameter grinding wheels and their inability to round-up stock runout. Also, it is difficult to produce the stringent roundness, size and concentricity required in such workpieces. The present invention has to do with a method of rounding-up small holes rapidly, thereby permitting much faster grinding cycles to be used, resulting in reduced costs. The apparatus uses a micro-computer to control the slide motions of the grinding machine and the speed of work rotation in response to grinding force signals received from load sensors in the wheelhead. When eccentric stock is encountered by the small abrasive wheel and its spindle, the wheel will normally deflect and will tend to follow the runout. With the computer control, these deflections of the wheel and spindle can be greatly reduced, thus providing a much faster truing-up process.

In one version of the invention the grinding process was simulated in a PDP 11/03 computer interfaced with an XY plotter and a simulated load sensor. Tests were carried out with simulated varying forces acting on the wheel and showed a 6-fold increase in effective stiffness of the wheel and spindle when under computer control in accordance with the invention and when operating in the CREEP FEED grinding mode. The following discussion describes the methods for estimating the rounding-up rate and the cycle time, as well as an analysis of CREEP FEED grinding. The object of the invention was to improve the performance of internal grinding and the reduction of grinding costs, as well as to improve the roundness and size tolerances on such precision workpieces as fuel-injection nozzles, aircraft valve parts, antifriction bearings, and automotive valve lifters. Since internal grinding is one of the more difficult processes in the manufacture of quality parts, considerable leverage can be obtained by improving this process.

SIGNIFICANCE OF SMALL HOLE GRINDING

The grinding of small diameter bores to precision tolerances is a particularly difficult and time-consuming operation. The wide-spread introduction of fuel-injection into the automotive industry has required high production of fuel-injection nozzles containing small diameter bores with close size, roundness, and concentricity requirements. Also, certain nuclear fuel elements require the production of small holes. Miniature ball bearings for precision instruments also involve the precision grinding of small holes. Many other examples of small hole grinding are to be found in industry.

In grinding small bores, the major factor that limits the production rate (cycle time) is the low stiffness of the small grinding wheels and their supporting structures. This results in their inability to roundup and correct geometric errors in a short period of time. The time required simply to remove the stock and grind the bore to size is much shorter than the time required to correct geometric errors and to achieve roundness and concentricity. Consequently, significant gains in production rate can be achieved if a faster system for rounding-up is available. In high production manufacturing operations, the cycle time plays a vital role in determining the cost of production. A reduction in cycle time can result in substantial annual savings.

BACKGROUND

Figure 3:
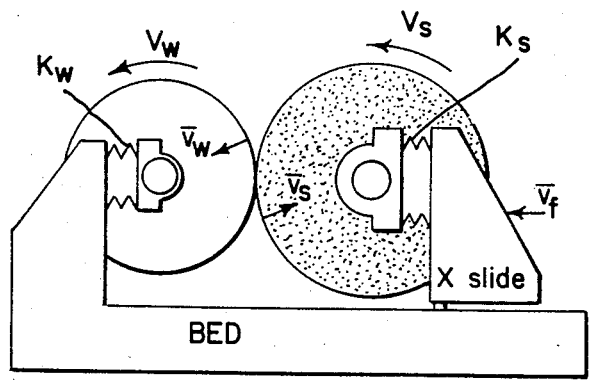
FIG. 3 is a schematic view of a theoretical grinding process.
Figure 4:
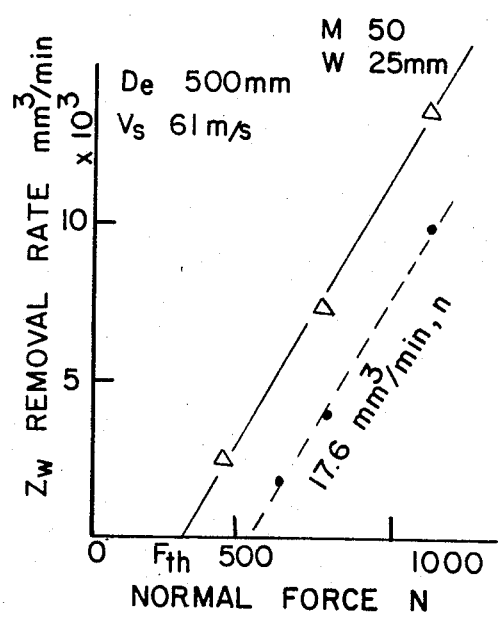
FIG. 4 is a graph showing the relationship between stock removal rate and normal force between the wheel and the workpiece in a grinding operation.

The following material presents certain principles of grinding and introduces the important parameters and variables that govern the grinding process. In general, the grinding process can be represented in the manner shown in FIG. 3, wherein the cross slide is fed at the rate $\bar{v}_f$, thus bringing the wheel and workpiece together to generate an interface normal force $F_n$. When the wheelhead and workhead "springs" $K_s$ and $K_w$ have been compressed enough to cause the induced normal force $F_n$ to exceed the THRESHOLD FORCE, $F_{th}$, stock removal will commence. The grinding behavior of various wheel-workpiece pairs can be shown by plotting the volumetric stock removal rate, $Z_w$, against the interface normal force, $F_n$, as illustrated in FIG. 4 for the internal grinding of AISI M50 steel with two different wheels. The wheel speed, $V_s$, is 61 meters/second and the reciprocal of the difference, in curvature $D_e$, between the wheel and the workpiece (the so-called EQUIVALENT DIAMETER) is 500 millimeters. This is represented by Equation (1) in FIG. 30, where + sign is used for external grinding and the − sign is used for internal grinding.

The slope of the stock removal curve is called the WORK REMOVAL PARAMETER, $\Lambda_w$, and the intercept on the $F_n$ axis is the THRESHOLD FORCE, $F_{th}$. The basic equation describing the stock removal is:
Equation (2) in FIG. 30.
This can also be written as:
Equation (3) in FIG. 30 where $D_w$ is the work diameter, W is the width of grind, and $\bar{V}_w$ is the rate of change of work radius.

From this follows Equation 4, where $F'_n$ is $F_n/W$ or the interface normal force intensity and $F'_{th}$ is $F'_{th}/W$ or the threshold force intensity. The WHEEL DEPTH-OF-CUT, h, is described in Equation (5). Differentiating Equation (5) with respect to "h", gives the CUTTING STIFFNESS, $K_c$ shown in Equation (6), where $V_w$ is the workpiece surface speed.

The dimensionless ratio of CUTTING STIFFNESS, $K_c$, to SYSTEM STIFFNESS, $K_s$, is shown in Equation (7) and relates elastic effects in grinding operations to the stiffness (or rigidity) of the system supporting the wheel and workpiece. This ratio governs the rate of rounding-up, error correction, sparkout time, and chatter behavior. Grinding systems with a large CUTTING STIFFNESS and a low SYSTEM STIFFNESS will be slow to roundup and will require a long sparkout time.

FIG. 6 illustrates a workpiece 12 in the form of a typical fuel-injection nozzle with a 4 mm bore 11 and a long, slender grinding wheel 17 for grinding the bore and a tapered seat at the other end. It will be appreciated that the rigidity, $K_s$, of this grinding system will necessarily be low. Workpieces often arrive at the grinding machine with some degree of out-of-roundness or eccentricity which must be corrected by the grinding operation. If the feed rate of the cross slide is set too high (fast feed), the available stock will be ground out before the eccentricity has been corrected. Consequently, in the prior art grinders, the feed rate must be slowed down to make available sufficient time for the part to be rounded-up.

By using the equations described above (and others), the performance of grinding cycles can be evaluated by computer simulation, where the rounding-up process can be followed revolution-by-revolution in the computer. This method has been checked against actual grinding tests to confirm the validity of the computer-calculated results; this was published in the Proc. 12th International Mach. Tool Design & Res. Conf., MacMillan Press Ltd., pp. 235-240, 1972. FIG. 5 shows the computer-simulated rounding-up process for grinding fuel-injection nozzles with an initial runout of 0.037 mm and a stock allowance of 0.100 mm. For the first two seconds of grinding the wheel-workpiece contact is intermittent with the wheel striking the "high spot" only. After that, the contact becomes continuous, because the wheel deflects an amount sufficient to absorb the runout. In this region, roundup is much slower and requires a long cycle time to produce a round hole.

The time required simply to remove the stock if there were no "rounding-up" problem can be found by using Equation (4) and inserting appropriate valves for the WORK REMOVAL PARAMETER and FORCE INTENSITY. This results in $\overline{V}_w$ of 12.2 mm/min and a time for 0.05 mm stock on the radius of 0.246 seconds. It can be seen, therefore, that the time necessary to roundup is two orders of magnitude larger than the time to remove the stock, i.e., 24 seconds compared with 0.24 seconds. Therefore, large gains in production rate can be achieved with a faster method of roundup.

COMPUTER CONTROLLED CREEP GRIND ROUNDUP

The present method of grinding small bores with fast roundup uses a microcomputer in conjunction with a load cell mounted on the wheelhead spindle to detect the grinding force acting on the wheel. It serves to feed the cross-slide carrying the wheelhead in such a manner as to maintain the spatial position of the cutting surface of the grinding wheel constant in spite of varying forces resulting from non-uniform stock distributions.

The system shown in FIG. 2 involves a workhead 14 carried on the table, which may be positioned in the Z direction by commands from the computer to the Z drive motor. The rotational speed of the workpiece is also governed by the computer. The high speed wheelhead 15 is mounted on a plate which may be set at an angular position $\theta$ in order to compensate for angular deflection of the wheel under the action of the grinding force, thereby maintaining the cutting surface of the wheel parallel to the workpiece centerline. The computer controls this angle by sending pulses to the $\theta$ drive stepping motor. The wheelhead and swivel plate are both mounted on the cross-slide driven by the X drive motor 21. The wheelhead is equipped with a load cell 20 which the computer can interrogate to obtain the grinding force.

In accordance with the present invention, the small bores with eccentric or non-uniform stock are rounded-up by feeding the grinding wheel into the work (in the X direction) until it is in continuous contact and then to rotate the work slowly (creep grind) while allowing the wheel to engage the uneven stock. As regions of heavy and light stock engage the wheel, varying deflection of the wheel would normally take place, so that a round, concentric bore would not result. In order to avoid this, the computer 25 interrogates the force sensor 20 at frequent intervals. As the grinding force increases or decreases, the computer repositions the cross-slide by an appropriate amount to maintain the cutting surface of the wheel 17 at the same radial position. In that way, the cutting surface of the wheel appears to have infinite rigidity and the workpiece is rounded-up within one or two revolutions of the workpiece, thus resulting in very fast grinding cycles. Since the position of the cutting surface of the wheel is not directly measureable, it is, therefore, determined indirectly. The position of the cutting surface of the wheel corresponds to the position of the cross-slide minus the system deflection. The computer interrogates the force sensor 20 to obtain the grinding force. This is divided by the system stiffness, $K_s$, to get the deflection. The deflection is subtracted from the cross-slide position to obtain the position of the cutting surface of the wheel. It is this position that is held constant under computer control.

BENEFITS OF INVENTION

The present invention results in a significant reduction in the grinding cycle time, particularly for small bore internal grinding operations and brings about improved productivity at lower cost. For example, one high-volume manufacturer of automotive valve lifters has stated that a 1-second reduction in the internal grind cycle time would result in $1,000,000 savings per year. Consequently, improved productivity in small-bore, internal grinding helps to reduce manufacturing costs and help companies that employ internal grinding operations to remain competitive. The system will be of particular benefit to those companies that manufacture antifriction bearings, automotive fuel-injection nozzles, nuclear fuel pellets, gyroscopes, and instruments.

DEFLECTION COMPENSATED ROUNDUP

It was possible to demonstrate the feasibility of maintaining the cutting surface of the grinding wheel in a fixed spatial position in spite of varying forces applied to the wheel. In order to do this without involving an actual grinding machine, the grinding process was simulated using an XY plotter to represent a 2-axis NC grinding machine and a manually-input voltage to simulate the load cell signal due to force fluctuations applied to the grinding wheel. The computer control was appropriately interfaced to both the XY plotter and the load cell signal. Values of the work removal parameter, and system stiffness (as well as other parameters typical of small-bore grinding) were entered into the computer. The computer drives the cross-slide (the X-axis of the plotter) until the wheel strikes the workpiece (detected by the computer when the load cell signal starts to increase). This was simulated by manually raising the voltage applied to the load cell interface printed circuit board. Then, after this "contact" has taken place, the computer reduces the work speed by some factor in preparation for a DEFLECTION COMPENSATED ROUNDUP (DCR). At this time the simulated load cell signal is raised and lowered manually to represent the effects of runout in the workpiece on the normal force, $F_n$. As the voltage rises, the computer passes "positive" pulses to the X-axis (cross-slide) in an effort to maintain the cutting surface of the wheel in a fixed position. As the voltage is reduced, the computer sends "negative" pulses (retraction pulses). Since there is no direct way to capture the actual position of the cutting surface of the wheel, the computer must calculate the position of the wheel. It does this by noting the current cross-slide position and subtracting the deflection from the position. When it finds that the cutting surface of the wheel is starting to move (due to spindle deflection DZ) under increasing force, it calculates the number of pulses to feed to the cross-slide (DX) to bring the wheel back to its original position, the calculation taking place in accordance with Equation 8, FIG. 30, in which AF is an attenuation factor, $K_c$ is the cutting stiffness, and $K_s$ is the system stiffness. After feeding DX to the cross-feed, it takes some time for the cross-slide to move (simulated by a time delay), the computer recalculates the deflection and subtracts it from the new current cross-slide position to determine the updated value of the wheel position Z. This process continues until one work revolution has taken place. During this process, the computer can generate a table of values of force F, cross-slide position X, deflection D, position Z of the cutting surface of the wheel, and number of pulses fed DX for each iteration. At the conclusion of a test run, these values can be retrieved from memory. A typical block of data is as follows:

DYNAMIC ROUNDUP DATA

| | |
|---|---|
| Delay Time | .05 sec. |
| Attenuation | .30 |
| $K_s$ | 2500 N/mm |
| $K_c$ | 14802 N/mm |
| Iteration Time = | .0553 sec. |

| FORCE (N) | CROSS-SLIDE POSITION (.5 um) | DEFLECTION (.5 um) | WHEEL POSITION (.5 um) | X PULSES FED (.5 um) |
|---|---|---|---|---|
| 5.1 | 68 | 4 | 62 | 0 |
| 5.7 | 68 | 4 | 62 | 0 |
| 6.1 | 68 | 4 | 62 | 0 |
| 6.9 | 68 | 5 | 61 | 1 |
| 8.1 | 69 | 6 | 61 | 1 |
| 9.4 | 70 | 7 | 61 | 1 |
| 10.7 | 71 | 8 | 61 | 1 |
| 12.2 | 72 | 9 | 61 | 1 |
| 13.6 | 73 | 10 | 61 | 1 |
| 14.9 | 74 | 11 | 61 | 1 |
| 16.6 | 75 | 13 | 60 | 2 |
| 17.8 | 77 | 14 | 61 | 1 |
| 19.2 | 78 | 15 | 61 | 1 |
| 19.9 | 79 | 15 | 62 | 0 |
| 20.3 | 79 | 16 | 61 | 1 |
| 20.7 | 80 | 16 | 62 | 0 |
| 21.4 | 80 | 17 | 61 | 1 |
| 21.4 | 81 | 17 | 62 | 0 |
| 21.4 | 81 | 17 | 62 | 0 |
| 21.4 | 81 | 17 | 62 | 0 |
| 21.3 | 81 | 17 | 62 | 0 |
| 20.5 | 81 | 16 | 63 | −1 |
| 20.4 | 80 | 16 | 62 | 0 |
| 19.9 | 80 | 15 | 63 | −1 |
| 18.9 | 79 | 15 | 62 | 0 |
| 17.6 | 79 | 14 | 63 | −1 |
| 16.5 | 78 | 13 | 63 | −1 |
| 15.2 | 77 | 12 | 63 | −1 |
| 13.8 | 76 | 11 | 63 | −1 |
| 12.6 | 75 | 10 | 63 | −1 |
| 11.5 | 74 | 9 | 63 | −1 |

Figure 7:
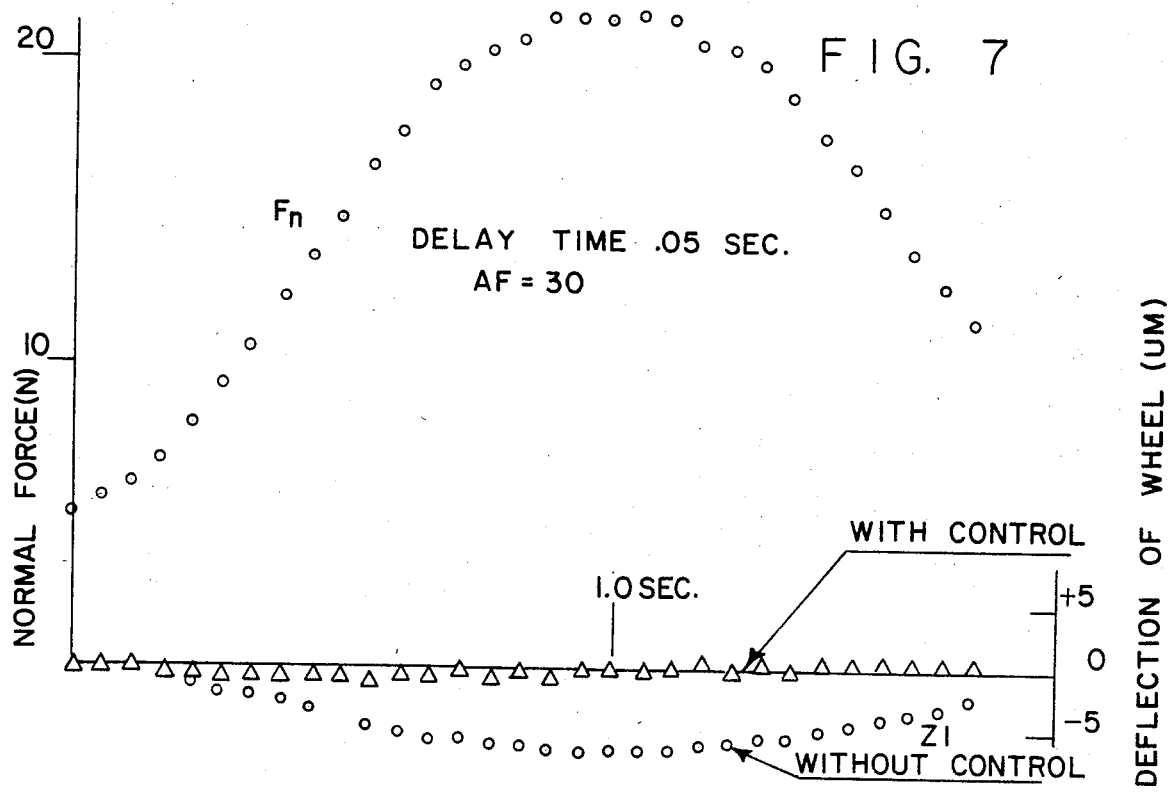
Figure 8:
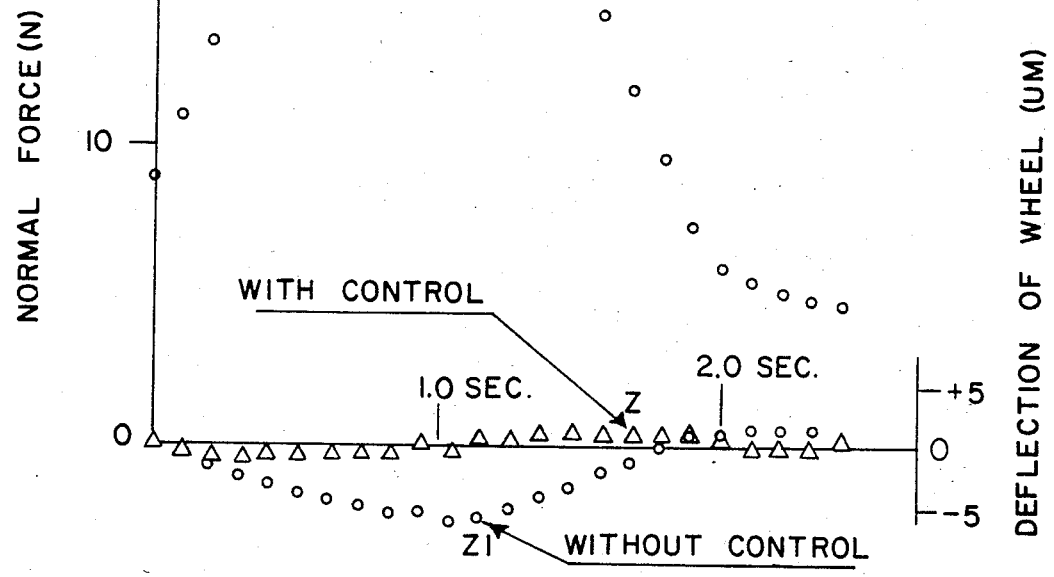

These data are plotted in FIG. 7, which shows the force F increasing to a maximum and then decreasing. The curve labeled Z shows the wheel position under computer control, while the curve labeled Z1 shows the wheel position that would have occurred without computer control. Thus, the deflection was reduced from 6.5 micrometers to about 0.5 micrometers following-error with computer control. FIG. 8 shows a similar behavior with a delay time of 0.1 seconds (instead of 0.05 sec.); the following error proved to be about 1 micrometer. For a delay time of 0.20 sec., FIG. 9 shows an increase in following-error of 1.5 micrometer. FIG. 10 shows the "following-error constant" plotted against delay time. As one would expect, very small following-errors will occur with high response systems.

Figure 11:
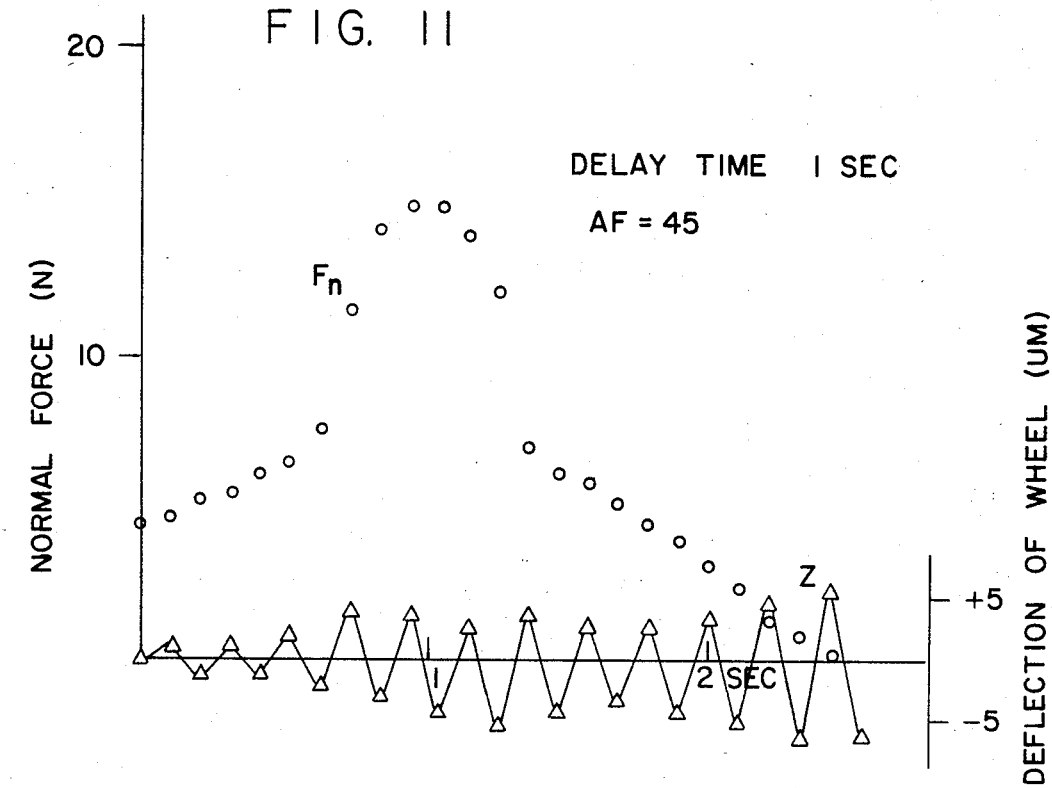
FIG. 11 illustrates unstable operation where the computer is overcompensating for wheel deflection.

In the preceding figures, the attenuation factor used in Equation (8) had a value of 30. If the attenuation factor (gain) is increased, the system becomes unstable, as illustrated in FIG. 11, for a value of 45. The wheel position Z is seen to oscillate with increasing amplitude. Consequently, there is a limiting value of "gain" that can be used.

RATE OF ROUNDING-UP

The rate of rounding-up depends upon the difference in "wheel depth-of-cut" on the high spot, $h_2$, and on the low spot, $h_1$. The runout p on the $(i+1)_{th}$ revolution is given by Equation (9) in FIG. 30. Now, if it is assumed in Equation (5) that the threshold force is negligible (which is not always permissible), then Equation (10) is true, where $F_2$ and $F_1$ are the forces on the wheel at the high and low spots, respectively, and $K_c$ is the cutting stiffness given by Equation (6). At the same time, note Equation (11) and (12), where $K_s$ is the system stiffness and d, is the uncut chip thickness or distance to the unstressed position of the wheel. Eliminating d, from Equations (11) and (12) gives Equation (13). Inserting this into Equation (9) yields Equation (14). The runout after "n" work revolutions is indicated by Equation (15) in FIG. 30.

The number of revolutions to reduce the runout to $p_n$ is shown in Equation (16) and the time to roundup is shown in Equation (17). From this equation, one might be led to believe that the roundup time would be less at high workpiece speed, $N_w$. However, it will be recalled from Equation (6) that the cutting stiffness, $K_c$, is proportional to workspeed. As a result, the roundup time is nearly independent of workspeed, as long as threshold forces are not encountered. For example, the following table shows the time necessary to reduce the runout to one-half (the half runout time) for several workspeeds:

| $N_w$ (RPM) | $K_c$ | $K_c + K_s/K_c$ | $t_{\frac{1}{2}}$ (sec) | |
|---|---|---|---|---|
| 6000 | 73417. | 1.004 | 1.736 | Without computer control |
| 600 | 7342. | 1.039 | 1.767 | " |
| 60 | 734. | 1.396 | 2.077 | " |
| 60 | 734. | 3.38 | .569 | With computer control |

$K_s$ = 291. N/mm
$\Lambda_w$ = .221 cumm/sec.N
w = 12.7 mm
$D_w$ = 4.06 mm
$p_o/p_\eta$ = 2

Evidently, increasing the workspeed does not result in substantial gains in roundup time. However, increasing the apparent stiffness by the use of computer control does result in substantial reduction of roundup time, as shown in the last line of the table. In FIG. 8, for 0.1 sec. delay time, the wheel deflection was reduced by a factor of 6; this is the equivalent of increasing the system stiffness, $K_s$, 6-fold to 1746 N/mm in the above example. This results in a "half runout time" of 0.569 secs. or about $\frac{1}{3}$ the time to roundup at 6000 rpm. Consequently, significant reductions in cycle time should be possible using DEFLECTION COMPENSATED ROUNDUP.

CREEP FEED GRINDING

Figure 12:
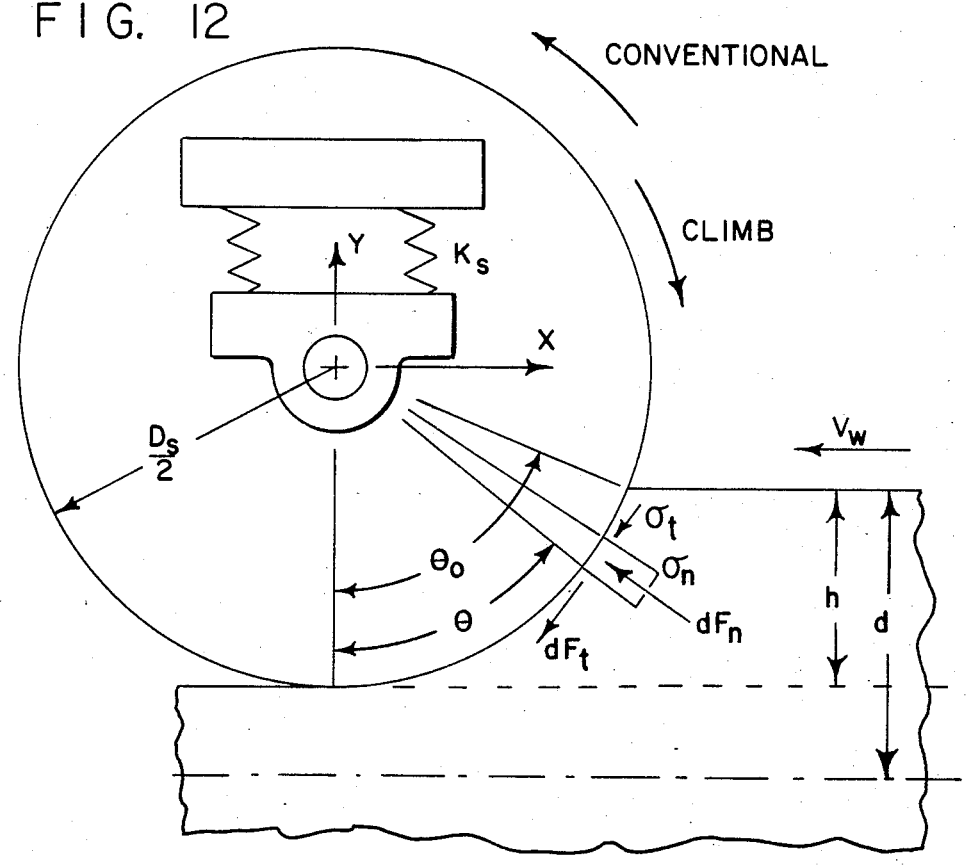
FIG. 12 is a vertical schematic view of a grinding wheel removing material from a workpiece under "creep feed" conditions.

In view of the fact that very slow workspeeds are necessary in order to accommodate the time required to move the cross-slide, the deflection compensated roundup process resembles "creep feed" grinding. This method of grinding is popular in Europe and is gaining acceptance in the U.S.A. It has been applied primarily to reciprocating surface grinders. The method consists of taking one, relatively-deep cut at very low workspeed, instead of many lighter cuts at high workspeed. The principles of CREEP FEED GRINDING are developed below and are related to the DCR process. FIG. 12 illustrates a grinding wheel taking a deep, creep-feed cut. The normal and tangential stress $\sigma_\eta$ and $\sigma_\tau$ are shown at the position $\theta$. The basic stock removal relationship is shown in Equation (18) and is analogous to Equation (2), where $Z''_w$ is the volumetric stock removal rate per unit area and $\eta_{th}$ is the threshold normal stress. Making use of Equation (19), the normal stress from Equation (18) is shown in Equation (20). Since Equation (21) is valid, where $\mu$ is the effective coefficient of friction, then an element of the normal force is shown in Equation (22). This leads to Equation

(23) for the normal force. The tangential force is obtained from Equations (24) and (25). The vertical force $F_y$ and horizontal force $F_x$ are found by integrating Equations (26) and (27), respectively. The integration takes place between the limits $\theta = 0$ and $\theta = \theta_o$, where $\theta_o$ is defined by Equation (28) and where + is used for climb grinding and − for conventional grinding. The results of the integration are shown in Equations (29) and (30). Also, the torque on the wheel shown by integrating Equation (31), results in Equation (32). These equations may be simplified where the wheel depth-of-cut, h, is small compared to the wheel radius, resulting in Equations (32a) and (33). At the same time, Equation 29 simplifies to Equation (34). For grinding conditions where the threshold stress is negligible, the second term of Equation (34) can be dropped, thus giving Equation (35), so that the cutting stiffness, $K_c$, is set forth in Equation 36, thus being in agreement with Equation (6).

STOCK REMOVAL RATE VS. WORKSPEED

Figure 13:
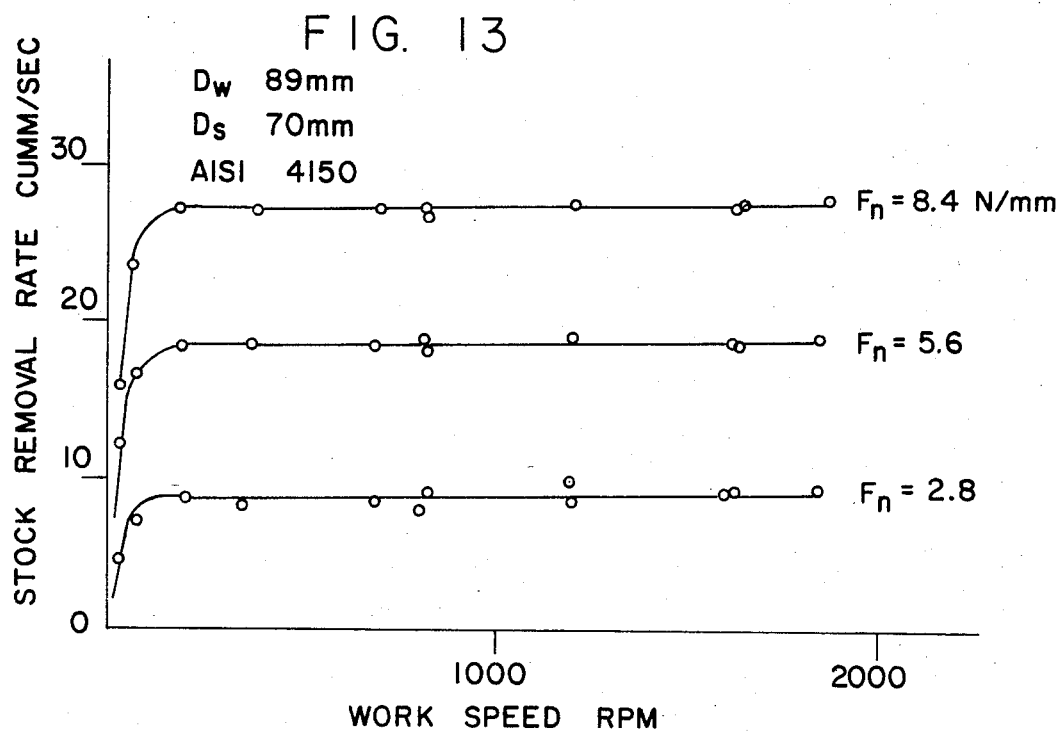
FIG. 13 shows the relationship between stock removal rate and work speed for several normal force intensities.

The relation between stock removal rate, $Z_w$, and workspeed is pertinent to creep feed grinding as well as DEFLECTION COMPENSATED ROUNDUP. The stock removal rate is expressed in Equation (37). In the absence of threshold forces, Equation (37a) holds true. Then, using Equation (36) and (37), the result is Equation (38), showing that the stock removal rate is independent of workspeed when threshold forces are neglected. This is confirmed by practical grinding tests described in an ASME transactions article (the effect of wheel-work conformity in precision grinding Trans ASME Vol. 77 n. 8 pp. 1325–1329, 1955) and shown in FIG. 13 where the workspeed was varied over a wide range. However, it will be seen that the stock removal rate does drop for very low workspeed. The reason why this is true has to do with the fact that the work removal parameter and the threshold force depend upon the difference in curvature between the wheel and workpiece. At normal workspeeds, the difference in curvature $\Delta$ is given by Equation (39). However, at very low workspeeds, the grinding wheel tends to grind its own curvature into the workpiece, regardless of the geometric curvature of the work. The surface in the immediate contact zone is a trochoidal surface (as shown in the ASME article) and it is the difference in curvature between the wheel and this trochoidal surface that effects the threshold forces and the stock removal rate. As a result, at very low workspeeds the effective difference in curvature is small and the threshold forces may not be negligible, causing a reduction in stock removal rate, as indicated in FIG. 13. The expression for the effective difference in curvature (from the ASME article) is shown in Equation (40).

Using the data of FIG. 5, the effective trochoidal curvature difference and the "Equivalent Diameter", $D_e$, for three workspeeds are given in the following table, when $D_w$ is 4.064 mm, $D_s$ is 2.286 mm., and $N_s$ is 100,000 rpm:

| $N_w$ (RPM) | $\Delta_i$ (mm$^{-1}$) | $D_e$ (mm) |
|---|---|---|
| 6000 | .0695 | 28.8 |
| 600 | .008 | 125. |
| 60 | .0008 | 1250. |

This shows a large increase in the effective $D_e$ at low workspeed, causing significant threshold forces (or $\sigma_{th}$) in Equation 34, which are responsible for the drop in stock removal rate in FIG. 13 at low workspeed. The magnitude of the threshold forces is generally unknown and can only be determined by measurement for a given wheel-workpiece pair and given operating conditions. Consequently, the value of the work removal parameter $\Lambda_w$ and $\sigma_{th}$ measured under the conditions of high workspeed may differ from those values at low workspeed. In spite of these effects, the computer, during DCR, is not concerned with the causes of the total grinding force, but only strives to maintain the cutting surface of the wheel in a fixed position.

SYSTEM IDENTIFICATION

It is important to distinguish between input variables to the grinding machine (such as FEEDRATE, WHEELSPEED, WORKSPEED, SPARKOUT TIME, DRESSING CONDITIONS, and FREQUENCY OF DRESSING), on the one hand, and input variables to the grinding process (which takes place at the wheel-work contact region), on the other hand. These latter variables are INDUCED NORMAL FORCE and CURRENT SHARPNESS OF WHEEL FACE and they govern the grinding process output variables, such as STOCK REMOVAL RATE (or WHEEL DEPTH-OF-CUT), WHEELWEAR RATE, SURFACE FINISH, and SURFACE INTEGRITY. Most grinding machines control only the machine input variables and leave the induced force and sharpness of the wheel face to vary as they may. Nevertheless, the induced force and the sharpness are very important and have profound effects on the grinding output variables.

The wheel sharpness, which may vary by a factor of 4 or more, is measured by the WORK REMOVAL PARAMETER, $\Lambda_w$, and is the slope of the stock removal curve in FIG. 4. The cutting stiffness, $K_c$, given by Equation (6) is inversely proportional to $\Lambda_w$ or the wheel sharpness. For that reason, it is necessary for the computer to measure $\Lambda_w$ for a particular wheel-work pair and to calculate the cutting stiffness $K_c$ for use in Equation (8) and in routine 45 of the program. It will be recalled that routine 45 calculates the number of cross-feed pulses needed to maintain the cutting surface of the wheel in a fixed position. It is also necessary for the computer to measure the overall system stiffness $K_s$ and this is done in computer routine 49 in FIG. 25.

It can be seen, then, that the closed-loop computer control of the spatial position of the wheel's cutting surface is possible, provided several conditions are met. First, the sensitivity of the load cell or force sensor 20 must be sufficient to provide a resolution of the order of 0.5 micron at the cutting surface. Wandering of the axis of the wheel spindle 16 (due to bearing precession or noise) should be less than 0.25 micron. Secondly, the response time of the feed means 19 for the cross-slide and the drive motor 21 should be of the order of 1 millisecond or less to provide satisfactory creep grind workspeeds.

VERSATILITY OF PROGRAM

Among the advantages of the present invention is its ability to perform a wide range of grinding functions. Depending on the particular workpiece, it is possible to select from a wide range of sub-operations to suit the situation. Once a workpiece has been loaded in the grinding machine it is possible to perform finishing operations on several surfaces, thus doing away with the necessity of several time-consuming loading and unloading steps. This results in increasing the productivity of grinding machines, reducing the cost of grinding operations, reducing the level of operator skill required, and improving the quality of ground workpieces. This all comes about by incorporating a microcomputer into the control system of the grinding machine. Significant productivity gains can often be realized on "batch produced" workpieces requiring several grinding operations if these operations can be performed in one staging of the workpiece. The "load and unload time" and the "setup time" for each successive grinding operation can be eliminated in this way.

The success of conventional grinding operations has generally depended upon the skill and experience of machine operators and setup personnel. In the past, the monitoring of the grinding process has been left up to the operator. Variations in the process variables, such as; rough stock, wheel sharpness, initial stock runout, spindle deflections and wheel breakdown have caused difficulties in maintaining size, taper, surface finish, and surface integrity. With the development of the above equations describing the grinding process, and the introduction of force sensors into the grinding system, the computer is able to monitor the process variables (stock variations, spindle deflections, wheel sharpness, workpiece runout, grinding force and power, etc.) and provide a much improved control of the grinding process, thereby reducing the operator skill required while maintaining or improving product quality.

FIGS. 14–20 show a multi-purpose grinding system that takes advantage of this concept. The system consists of a grinding machine 30 with two axes (X,Z) driven by feed means 38 and 50 including DC Servo motors 49 and 50 with one or two wheelheads 35 and 35a mounted on the cross slide (X), each head being equipped with a load sensor 24 which feeds force signals to the computer control 25. The control with its program positions the X and Z slides and adjusts the feed rates to maintain certain force levels during the grinding process. Manual or automatic post-process gage 51 sends signals back to the computer to eliminate size drift. The two wheels 37 and 37a can be applied to the surface 31 of the workpiece 32 usually in a sequential manner to execute automatically a series of grinding operations. In some applications they may grind simultaneously on the workpiece, but usually one is clearing the workpiece while the other is grinding. The wheels can be dressed by a diamond roll 52 (FIG. 16) or single-point diamond 53 (FIG. 17). The wheelheads may be set at an angle (B) to the X feed direction and dressed so as to produce a bore or O.D. grinding surface as well as a face grinding surface.

Figure 14:
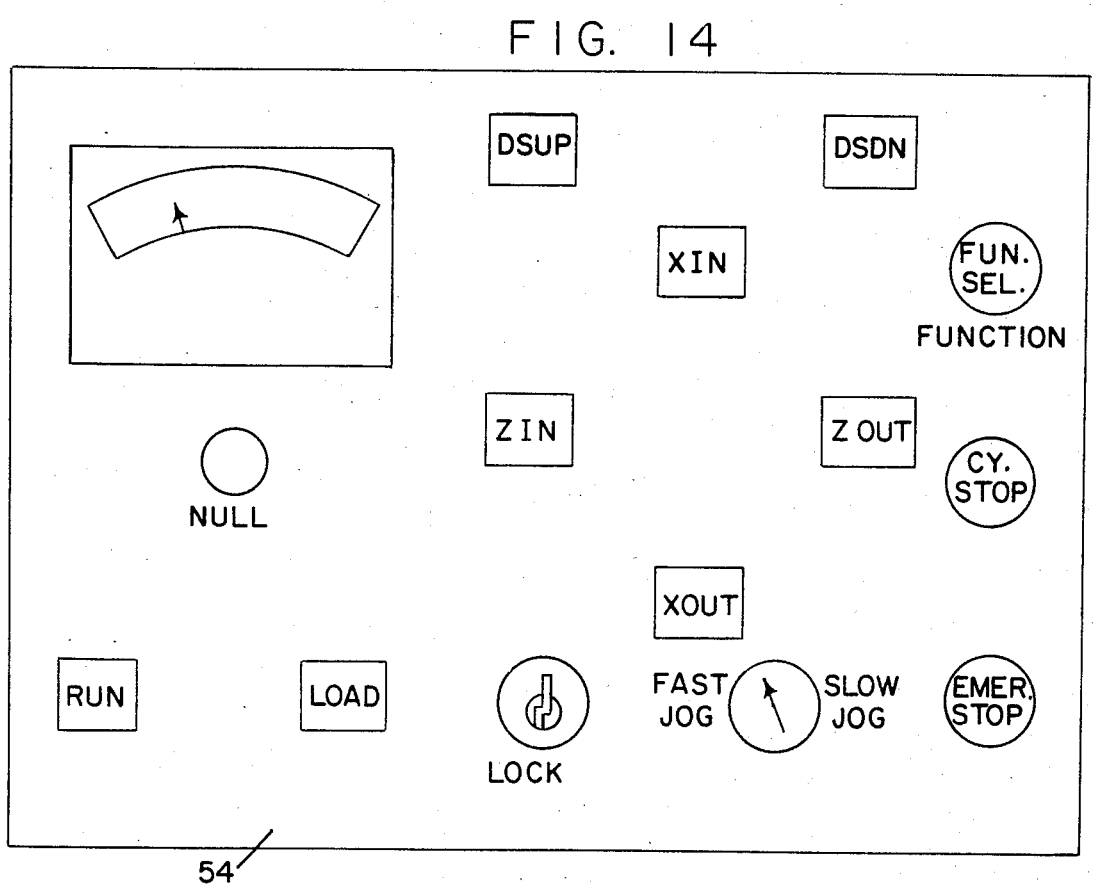
FIG. 14 shows an operator's panel in the grinding machine.
Figure 15:
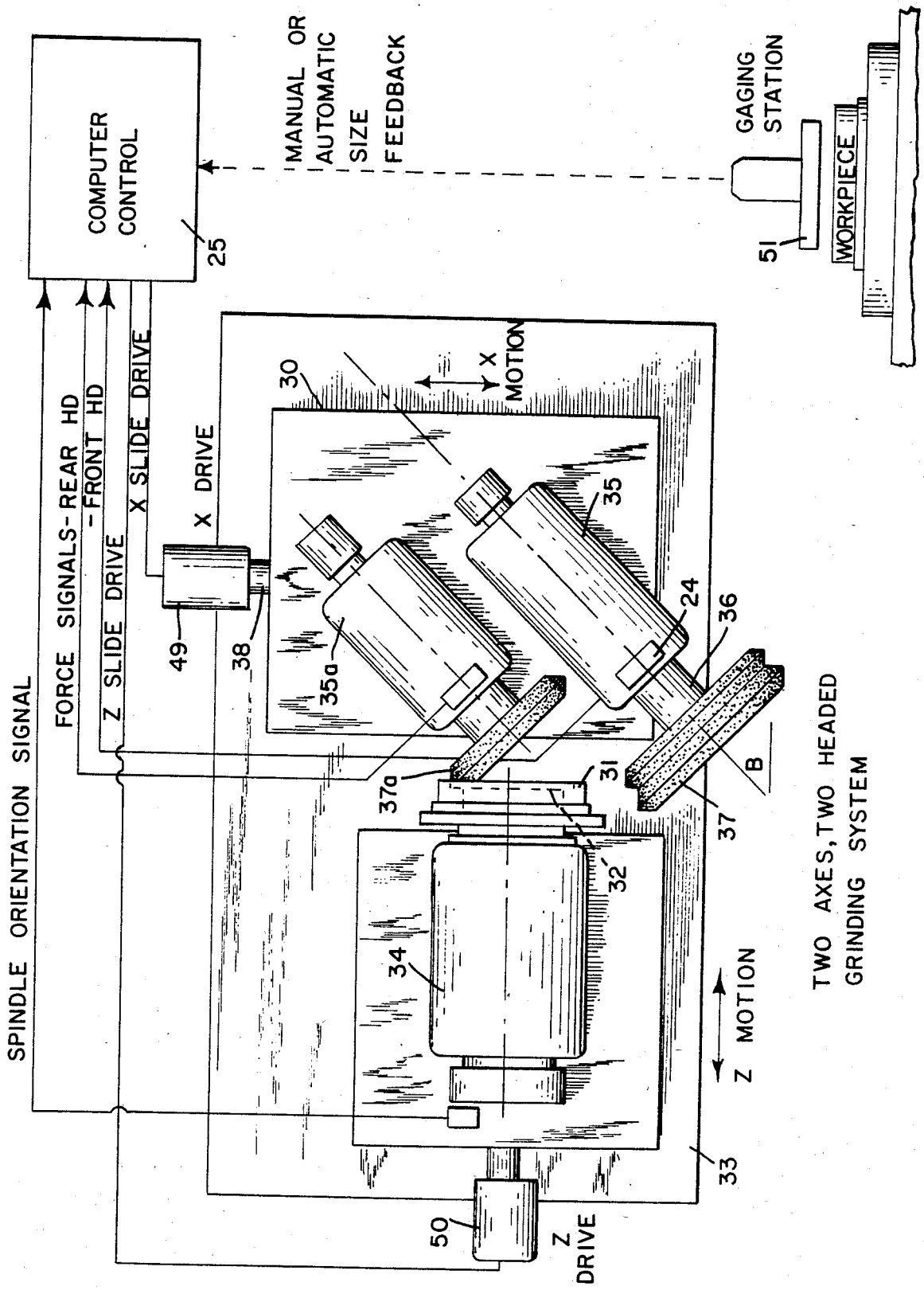
FIG. 15 is a plan view of another grinding machine embodying the principles of the present invention.

The computer 25 consists of a DEC PDP 11/03 computer with a CRT terminal and dual floppy disc drive mounted in a cabinet with suitable interfacing to the machine. The operator's push-button panel 54 is shown in FIG. 14 for a single load cell system (X forces only). The load cell meter is at the left, the six centrally located buttons are used in setup for jogging the slides, the "LOAD" button is for loading a workpiece on autoloaders. The "RUN" button is used in response to instructional messages that appear on the console terminal. The "FUNCTION" button is used to call up a "menu" of functions on the console. The "CYSTOP" is used to interrupt a cycle and bring the slides to their normal OUT position. The "EMER STOP" stops all feed motions immediately and workhead and wheelhead drives. The motor START push buttons are on a separate panel and are not controlled by the computer. The computer never starts any spindle drive motors.

The wheelheads are optionally equipped with an X load cell 24 or an XZ load cell, although the system can operate with no load cell. Noncontacting displacement sensors of the type shown and described in the patent of Hahn U.S. Pat. No. 3,555,741 are usually installed inside the wheelhead body, which, after calibration, produce signals indicative of the grinding force. For the X load cell, only the component of force normal to the wheelhead axis is measured. For the XZ load cell, both the normal and axial components are measured.

In addition to the load cells, there may be a spindle orientation signal generated by a non-contacting switch at the rear end of the workhead. This signal is used to synchronize the reading of the forces with the spindle orientation so that sector-shaped parts as well as continuous parts can be ground. The reading of the grinding force is generally done eight times per work revolution, but may be altered to accommodate any number of sector-shaped parts.

When the "FUNCTION" button is pushed on the control PB panel (FIG. 14), the following message appears on the console:

| TYPE | CURRENT # | |
|---|---|---|
| | "C" | To Calibrate Load Cell |
| | "GN" | and "OPER NO" to Set Grind Cycle - New |
| | "GU" | and "OPER NO" to Set Grind Cycle - Used |
| | "DS" | and "OPER NO" to Set Dress Cycle |
| | "DN" | and "OPER NO" to Dress New Wheel |
| | "D" | and "OPER NO" to Dress |
| | "S" | To Set Up on OPER 1 |
| | "E" | and "OPER NO" to Execute OPER |
| | "EN" | and "OPER NO" to Exec/Get Param's - New |
| | "EU" | and "OPER NO" to Exec/Get Param's - Used |
| | "L" | To Grind Sequence of Parts |
| | "M" | and "OPER NO" to Display/Modify Data |
| | "X" | and "OPER NO" to Change X Size |
| | "Z" | and "OPER NO" to Change Z Size |
| | "P" | for Job Performance Report |
| | "J" | to Jog Slides |

The operator may then select any of these functions. It is assumed at this point that a Part Program has already been loaded on the floppy disc. Part Programming will be discussed later. Each of these items is discussed in detail following.

The selection of CALIBRATE LOAD CELL causes a series of messages instructing the operator how to calibrate the load cell. This is only required once with a given wheelhead and spindle. The calibration data will be stored in the Current Part No. File ready for use when that Part Number is rerun. However, if the length of the quill, the nominal diameter of the wheel, or the swivel angle BETA is changed at some time, recalibration is necessary.

The calibration procedure consists of applying a prescribed force in the X or Z direction at the midpoint of the X or Z cutting surface on the wheel and then pushing the "RUN" button.

It will be recognized that, for setups where the angle BETA is significant, an X force will cause an axial deflection of the wheel spindle producing a Z load cell signal and vice versa, i.e., the X and Z load cell signals are coupled. In order to get the X force and Z force, the computer solves a pair of simultaneous equations so that the operator need not be concerned with this cross-coupling effect.

Typing "GN" or "GU" and the Operation Number causes the computer to calculate and set the items below, thus defining the grind cycle.

COMPUTER-GENERATED OPERATIONAL DATA

X FEEDRATE FLAG (FEEDRATE=1, CONTROLLED FORCE=0) -B
Z FEEDRATE FLAG (FEEDRATE=1, CONTROLLED FORCE=0) -B
NO. OF INDEXES REQD FOR FACING -B
NO. OF INDEXES REQD FOR BORE GRIND -B
% INITIAL WH. SHARPNESS TO INITIATE DRESS -A
DIAMOND ROLL DRESS DWELL (0.1 sec) -A
Z EQUIVALENT DIAMETER (CM) -B
Z WHEEL BREAKDOWN FORCE (DAN) -B
ACCEPTABLE RUNOUT AT 1st SIZE TIR (UM) -A
EFFECTIVE CUTTING Z WIDTH (MM) -B
EFFECTIVE CUTTING X WIDTH (MM) -B
GRINDING VECTOR FEED RATION (X/Z) -B
DRESSING VECTOR FEED RATIO (X/Z) -B
DRESS LEAD X DIRECTION (UM), FACE DRESSING -A
Z ROUGHING FEEDRATE (UM/SEC) -B
Z FINISH FEEDRATE (UM/SEC) -B
Z RECIP TRAVERSE RATE (MM/SEC) -B
X FACING TRAVERSE RATE (MM/SEC) -B
SEARCH REEDRATE (UM/SEC) -A
X DRESS FEEDRATE (UM/SEC), DIA. ROLL DRESS -A
NEW WHEEL XDRESS FEEDRATE (UM/SEC) -A
DRESS LEAD, Z DIRECTION, OD DRESS (UM) -A
Z DEPTH OF DRESS (UM), FACE DRESSING -A
Z ROUGH GRIND FORCE (N) -B
Z FINISH STOCK (UM) -B
X WHEEL BREAKDOWN FORCE (DAN) - NEW -B
X EQUIVALENT DIAM. (CM) - NEW -B
X WHEELWEAR PARAMETER (CUMM/HR*N**2) - NEW -B
X COMPENSATION (UM) - NEW ADAPTIVE -B
ROUGH GRIND ANGULAR WH'HD INDEX (P) - NEW ADAPTIVE -B
FINISH GRIND ANGULAR WH'HD INDEX (P) - NEW ADAPTIVE -B
X ROUGH GRIND FORCE (N) - NEW ADAPTIVE -B
X ROUGH FEEDRATE (UM/SEC) - NEW ADAPTIVE -B
X FINISH FEEDRATE (UM/SEC) - NEW ADAPTIVE -B
NORMAL FORCE TO GIVE SURFACE FIN. (.IN) - NEW -B
SPARKOUT TIME (0.01 SEC) - NEW ADAPTIVE -B
X FINISH STOCK (UM) - NEW ADAPTIVE -B The selection of SET DRESS CYCLE permits the operator to establish the slide movements and positions for dressing the grinding wheels. Many dress cycles can be provided by the "Dress Select Byte" DSB. The part programmer selects the type of dress cycle for each operation from the DSB table and enters the value of DSB for a given operation in the Part Program. The computer searches an internal table and fetches the proper dress program from permanent memory to carry out the dressing operation corresponding to the current operation number (CUOPNO). Each grinding operation on a multioperation part must have the same type of dressing operation. However, each wheel, on the front or rear wheelhead, can have more than one pair of cutting surfaces. This is referred to as a compound wheel and is illustrated in FIG. 16 where one section of the wheel is used to do an operation requiring a ZFEED while another portion of the wheel is used to do a vector feed VECFED (where both X and Z feed simultaneously). In this way, the system can handle a wide variety of dressing cycles from a single-point diamond, diamond roll, single or double ball track radius dressing, etc.

The selection of "DS" and "OPER NO" causes instructions to appear on the console directing the operator to jog the wheel up close to the dresser and then to close the guards, start heads and push "RUN". The slides will then feed acccording to a computer set feed rate and a programmed depth of dress. (These values are alterable at the console if desired.) The dress passes can be repeated as desired until the NEW wheel is satisfactorily dressed. The slide positions at this point are captured and retained for later dresses.

If one attempts to dress the wheel or execute an operation before establishing the dress cycle the computer will instruct the operator to set the dress cycle first.

The selection of NEW WHEEL DRESS causes a new wheel to be dressed to new wheel starting size.

The selection of DRESS causes the appropriate wheel to be dressed for the operation number typed in. The original X and Z slide positions for the previous dress are updated to the new dress position. The depth of dress in the X and Z directions are set by the computer, but are alterable at the console if desired. The slides will retract to their "OUT" positions.

The problem of setting up a grinding machine and grinding the first part to size in a minimum of time can be made much easier with computer control. On a multioperation part, with, for example, five operations, using two wheelheads, there may be as many as 25 coordinate positions that must be set. These include, rapid traverse, first size, and final size positions as well as positions required for jumping over lips where a recessed surface is to be ground behind a lip. With the present program it is only necessary to clean grind manually one X and one Z reference surface on the part with each head. Then that surface must be measured and the X and Z errors entered on the console. The computer then sets, for all operations, final size, first size, lip jumps, and rapid traverse positions based on part dimensions relative to the reference surfaces. It should be noted that the Part Program contains the workpiece dimensions. In contrast to NC programming, it is not necessary for the Part Program to specify any slide movements or positions. All slide movements and positions are determined by the computer, thereby eliminating much tedious programming work.

The selection of "E" and "OPER NO" causes the program to load the operational data into a "working data block" (WDB) which makes this data available to the generalized grind programs. If sizes have not yet been set, the computer insists that sizes be set first before attempting to execute the operation.

Typing EN/EU and OPER NO causes the computer to execute that operation and at the same time to determine the Work Removal Parameter, the System Rigidity and the Threshold Force. These items are required by the computer to efficiently control the grinding cycle, to compensate for deflection in the system, and to monitor the current sharpness of the grinding wheel.

Typing "L" instructs the computer to grind each operation, starting with OPER 1 and continuing until all operations have been completed.

The data for each operation can be displayed and altered if the Operator's PB Panel (FIG. 14) is unlocked. The program has the capacity for a number of operations. Part of the data is entered at the console when programming a new part number. The remainder of the data is generated by the computer. In entering the data for a new part it is only necessary to enter dimensional data obtained from the part print. All feed rates, sparkout times, compensation for wheel wear, amount of finish stock, and other grinding parameters are generated by the computer. In this way, the need for highly experienced grinding personnel is alleviated. Computer-generated grinding cycles are based upon grinding process equations stored in the computer. It is not necessary to know any "Programming Language" in order to program the computer to grind a part. The following list shows the items of PROGRAMMING DATA that must be entered:

1. Number of Operations
2. Coolant (Emul=0, Chem. Sol.=1, Oil=2)
3. Autoload=1, Handload=0
4. Workspeed (RPM)
5. Workhead Stall Torque (N*M)

REAR WHEELHEAD DATA

6. Wheelspeed (RPM)
7. New Wheel Z Depth of Dress (UM)
8. New Wheel X Depth of Dress (UM)
9. Width of Cutting Peripheral Surface of Wheel (MM)
10. Width of End Cutting Surface of Wheel (MM)
11. New Wheel Diameter (MM)
12. Used Wheel Diameter at Discard (MM)
13. Grit Size (60,80, . . . etc.)
14. Wheelhead Swivel Angle, BETA (DEG)
15. Wheelhead Power (KW)
16. Wheel Structure Number
17. Wheel Hardness (H,I,J . . . =0,1,2 . . . )
18. Load Cell Byte (None=0,XCell=1,XZCell=2)
19. Angular Wh'hd Index Ratio (Whl.Adv UM/THPULS)

FRONT WHEELHEAD DATA

20. Wheelspeed (RPM)
21. New Wheel Z Depth of Dress (UM)
22. New Wheel Depth of Dress (UM)
23. Width of Cutting Peripheral Surface of Wheel (MM)
24. Width of End Cutting Surface of Wheel (MM)
25. New Wheel Diameter (MM)
26. Used Wheel Diameter at Discard (MM)
27. Grit Size (60,80, . . . etc.)
28. Wheelhead Swivel Angle, BETA (DEG)
29. Wheelhead Power (KW)
30. Wheel Structure Number
31. Wheel Hardness (H,I,J . . . =0,1,2 . . . )
32. Load Cell Byte (None=0, XCell=1,XZCell=2)
33. Angular Wh'hd Index Ratio (Whl.Adv UM/THPULS)

OPERATION 1 DATA

34. Adaptive Control=1, Conventional Cont.=0
35. Wheelhead, Rear=0, Front=1
36. Dressing Configuration (See DSB Table) DSB=
37. Type of Grind (XGrind=0,ZGrind=1,+/−VecGrind=2/3)
38. Interrupt for manual gage at 1st size=1
39. Preoperation Dress=1
40. 1st Size Dress=1
41. No. Parts to Skip Dress (No Skip=1)
42. Clean Grind Face without Sizing=1
43. Vector Recip. Ratio - Numerator (XP) *
44. No. of Sectors (Continuous Surface=0)
45. Circumferential Length of Sector (MM)
46. +/− XSize Tolerance Desired (UM)
47. +/− ZSize Tolerance Desired (UM)
48. Desired Surf. Fin. on Face (100*RA) (UM)
49. Desired Surf. Fin. on Bore (100*RA) (UM)
50. Vector Recip. Ratio - Denominator (ZP) *
51. Radial Stock Required to Initiate Dressing (UM)
52. XStock Allowance (UM)
53. ZStock Allowance (UM)
54. X Lip Clearance (UM)
55. Width of Face on Part (UM)
56. Facing XStroke (UM)
57. Length of Bore (UM)
58. Recip. Bore Stroke (UM) (After 1st Size)
59. Work Diameter (UM) (+/− for OD/ID)
60. ZSize Relative to Setup Face (UM) (+ is deeper)

Most of the Programming Data items are self-evident. Item 19 refers to machines with an angular indexable plate under the wheelhead. In internal plunge grinding as the rough grinding force is applied to the cantilever-supported grindihg wheel, the wheel spindle undergoes a small angular deflection as well as a lateral deflection. The angular deflection produces a taper in the workpiece. Conventional grinding machines use the sparkout process to correct this taper and bring the bore to size. This sparkout process requires some time (about 3 TIME CONSTANTS). The present invention can eliminate the taper due to the rough grind force by swiveling the wheelhead appropriately each cycle during the rough grind, thereby reducing the sparkout time required and consequently resulting in a shorter cycle. Item 19 gives the advance of the cutting surface of the wheel for each pulse sent to the swivel plate stepping motor (THPULSES).

Item 34 relates to adaptive control of XGRIND cycles the wheel size changes. In internal grinding, the new grinding wheel nearly "fills" the hole. As the wheel wears down to discard size (USED WHEEL) the cutting action of the wheel changes. This, in turn, causes size, taper and surface finish changes in the workpiece. In order to hold size, taper and surface finish more consistently through the life of a wheel, the cycle must be changed as the wheel becomes smaller. The feedrates, sparkout times, wheelwear compensation and other cycle parameters can be adaptively changed over the life of the wheel. This is referred to as "DE ADAPTIVE". Setting the adaptive flag ON will cause a linear progressive change of all cycle parameters from the values given in the "NEW WHEEL" section to those values given in the "USED WHEEL" section (See Computer-Generated Data for NEW WHEEL and USED WHEEL). With "DE ADAPTIVE", the useful life of a wheel for internal operations can be extended without impairing workpiece quality. If the adaptive flag is not set, the computer will use the values given in the "USED WHEEL" section throughout the life of the wheel.

Item 36 selects the proper dressing program. Setting this item to 1 (DSB=1), will cause the dressing program for the configuration shown in FIG. 16 to be used. Other dressing programs can be selected according to the DSB Table.

Item 37 refers to selection of the grinding feed direction; i.e., the X or Z direction or a +Vector feed where the slides feed simultaneously in the +X and +Z directions or a −Vector feed where they feed simultaneously in the +X and −Z direction.

Item 38 refers to "Manual Gaging". By setting this flag, grinding machine 30 will grind to 1st Size, then retract to the OUT position and ask the operator to gage the workpiece and enter the amount of stock to bring the part to exact size.

Item 43 is the numerator of the vector recip. ratio. This ratio gives the number of X Pulses to be fed (numerator) for a number of Z Pulses (Denominator) Item 50. This causes the machine to reciprocate in an oblique direction. If Item 43 is 0, it will reciprocate in the Z direction.

Item 54 refers to the radial height of a lip in case the operation requires grinding behind a lip. This allows the wheel to clear the lip.

THE PROGRAMMING DATA listed above is all that is required to program a Part Number. However, additional data is required to actually carry out a grinding cycle. This additional data (COMPUTER-GENERATED DATA) is also displayed on the terminal and may be altered if the panel is unlocked. Some of these items are calculated (b); some are set to given values (A). The "GN/GU" command causes this to happen. Some are obtained during a set size procedure (S) using the "S" command. Some are obtained from the grinding parameter test (D) using the "EN/EU" command, where the computer measures the grinding characteristics of the particular wheel - workpiece pair including the system rigidity. Based upon this data, the computer sets the rough and finish grind cycle parameters. The COMPUTER-GENERATED DATA are as follows:

COMPUTER-GENERATED OPERATIONAL DATA
DAN=DeckaNewtons
UM=0.001 MM
 61. XFeedflag (Feedrate=1, Controlled Force=0) -B
 62. ZFeedflag (Feedrate=1, Controlled Force=0) -B
 63. No. of Indexes required for facing -B
 64. No. of Indexes required for bore grind -B
 65. % initial wheel sharpness to initiate dress -A
 66. Diamond Roll Dress Dwell (0.1 sec) -A
 67. Z Equivalent Diameter (CM) -B
 68. Z Wheel breakdown Force (DAN) -B
 69. Z Threshold Force (N) -D
 70. Z Work Removal Parameter (CUMM/MIN N) -D
 71. Z System Rigidity (DAN/MM) -D
 72. Acceptable Runout at 1st Size TIR (UM) -A
 73. Effective Cutting Z Width (MM) -B
 74. Effective Cutting X Width (MM) -B
 75. Grinding Vector Feed Ratio (X/Z) -B
 76. Dressing Vector Feed Ratio (X/Z) -B
 77. Dress Lead X Direction, Face Dress (UM/REV) -A
 78. Z Rough Feedrate (UM/SEC) -B
 79. Z Finish Feedrate (UM/SEC) -B
 80. Z Recip. Traverse Rate (MM/SEC) -B
 81. X Facing Traverse Rate (MM/SEC) -B
 82. Search Feedrate (UM/SEC) -A
 83. X Dress Feedrate (UM/SEC),Dia.Roll Dress -A
 84. New Wheel X Dress Feedrate (UM/SEC) -A
 85. Dress Lead Z Direction, OD Dress (UM) -A
 86. Z Depth of Dress (UM), Face Dressing -A
 87. Z Rough Grind Force (N) -B
 88. Z Finish Stock (UM) -B
 89. X Size Position (UM) -S
 90. Z Size Position (UM) -S
NEW WHEEL DATA
 91. X Wheel Breakdown Force (DAN) -B
 92. X Equivalent Dia. (CM) -B
 93. X Threshold Force (N) -D
 94. X Wheelwear Parameter (CUMM/HR*N**2) -B
 95. X Work Removal Parameter (CUMM/MIN*N) -D
 96. X System Rigidity (DAN/MM) -D
 97. X Compensation (UM) -B
 98. Rough Gr. Angular Wh'hd Index (P)
 99. Finish Gr. Angular Wh'hd Index (P)
 100. X Rough Gr. Force (N) -B
 101. X Rough Feedrate (UM/SEC) -B
 102. X Finish Feedrate (UM/SEC) -B
 103. Normal Force to Give Surface Finish (0.1N) -B
 104. Sparkout Time (0.01 sec) -B
 105. X Finish Stock (UM) -B
USED WHEEL DATA
 106. X Wheel Breakdown Force (DAN) -B
 107. X Equivalent Dia. (CM) -B
 108. X Threshold Force (N) -D
 109. X Wheelwear Parameter (CUMM/HR*N**2) -B
 110. X Work Removal Parameter (CUMM/MIN*N) -D
 111. X System Rigidity (DAN/MM) -D
 112. X Compensation (UM) -B
 113. Rough Gr. Angular Wh'hd Index (P)
 114. Finish Gr. Angular Wh'hd Index (P)
 115. X Rough Gr. Force (N) -B
 116. X Rough Feedrate (UM/SEC) -B
 117. X Finish Feedrate (UM/SEC) -B
 118. Normal Force to Give Surface Finish (0.1N) -B
 119. Sparkout Time (0.01 sec) -B
 120. X Finish Stock (UM) -B Although most of the items are self-explanatory, the following information will be helpful:

Items 61 and 62—The computer decides for the current operation whether it should execute a controlled-force grind or a feedrate grind. If the induced forces are too small it may have to resort to a feedrate grind. In Controlled-Force grinds, the forces are monitored and are used to gain better control of the grinding process. For feedrate grinds, it sets the feed flag.

Items 63 and 64—Where the length of bore or width of face is greater than the cutting width on the wheel, the program makes a series of plunge grinds to 1st size and then reciprocate grinds to final size. This is a faster method than the conventional reciprocate grinding of long bores or wide faces.

Items 67, 92, 107—These give the Equivalent Diameter, DE, for shoulder grinding (ZDE) with angled wheelheads (FIG. 16) as well as the (XDE) for bore grinding with NEW and USED wheel size. The DE influences wheel breakdown and threshold forces. DE is a measure of the difference in curvature between wheel and work at the region of contact.

Item 68—gives the calculated value of thrust force required to break the wheel down.

Item 69—gives the measured value of the threshold force required to start grinding in the Z direction. This occurs only if a Z load cell is present.

Item 70—gives the measured value of the Z work removal parameter. This occurs only if a Z load cell is present.

Item 71—gives the measured value of the Z system rigidity. This occurs only if a Z load cell is present.

Items 75, 76—refer to the ratio of X pulses fed to Z pulses fed. On Vector grinds the Vector Feed Ratio is set according to the ratio of X stock allowance to Z stock allowance. The Dressing Vector Feed Ratio is set to feed the wheel into the dress roll orthogonal to the wheelhead axis. This maintains the effective cutting widths on the wheel as it becomes smaller.

Items 78, 101, 116—the Z rough feed rate, and the NEW and USED wheel X rough feed rates are calculated so as to grind as aggresively as possible without stalling the wheelhead, the workhead or breaking the wheel down. The X and Z rough grind forces are also subject to these constraints. (Items 87, 100 and 115.)

Items 79, 102, 117, 103, 118—the finish feed rates and corresponding forces are calculated to give the desired surface finish.

Items 88, 105, 120—the amount of finish stock, i.e., the 1st size points are calculated on the basis of the system deflection at the end of the rough grind.

Items 89, 90—these are the coordinates at final size for this operation measured from the dresser position.

Items 94, 109—this parameter is calculated by formulas in the software and is used to calculate the wheel-wear occurring during rough grind. This wheelwear is increased by 3 UM to give the X compensation, i.e., Advance of X slide per dress.

Items 98, 99, 113, 114—refer to the anguar wheelhead index discussed under Item 19 in the Programming Data.

The selection of "X" and "OPER NO" causes a message to appear instructing the operator to type in the size change desired.

The selection of "Z" and "OPER NO" causes a message to appear instructing the operator to type in the size change desired.

In order to reduce the need for highly skilled and experienced personnel to set up grinding cycles, and to provide grinding machines that are simple and straightforward to use, the program generates its own grinding cycle parameters. These include Rough Grinding Feedrate or Grinding Force, Finish Grinding Feedrate, Setting 1st Size Point (Finish Stock), Sparkout Times, Compensation for Wheelwear, and When to Dress the Wheel (Sharpness Dress) Optional. These parameters depend, in turn, upon certain other grinding process parameters and characteristics of the machine.

Figure 18:
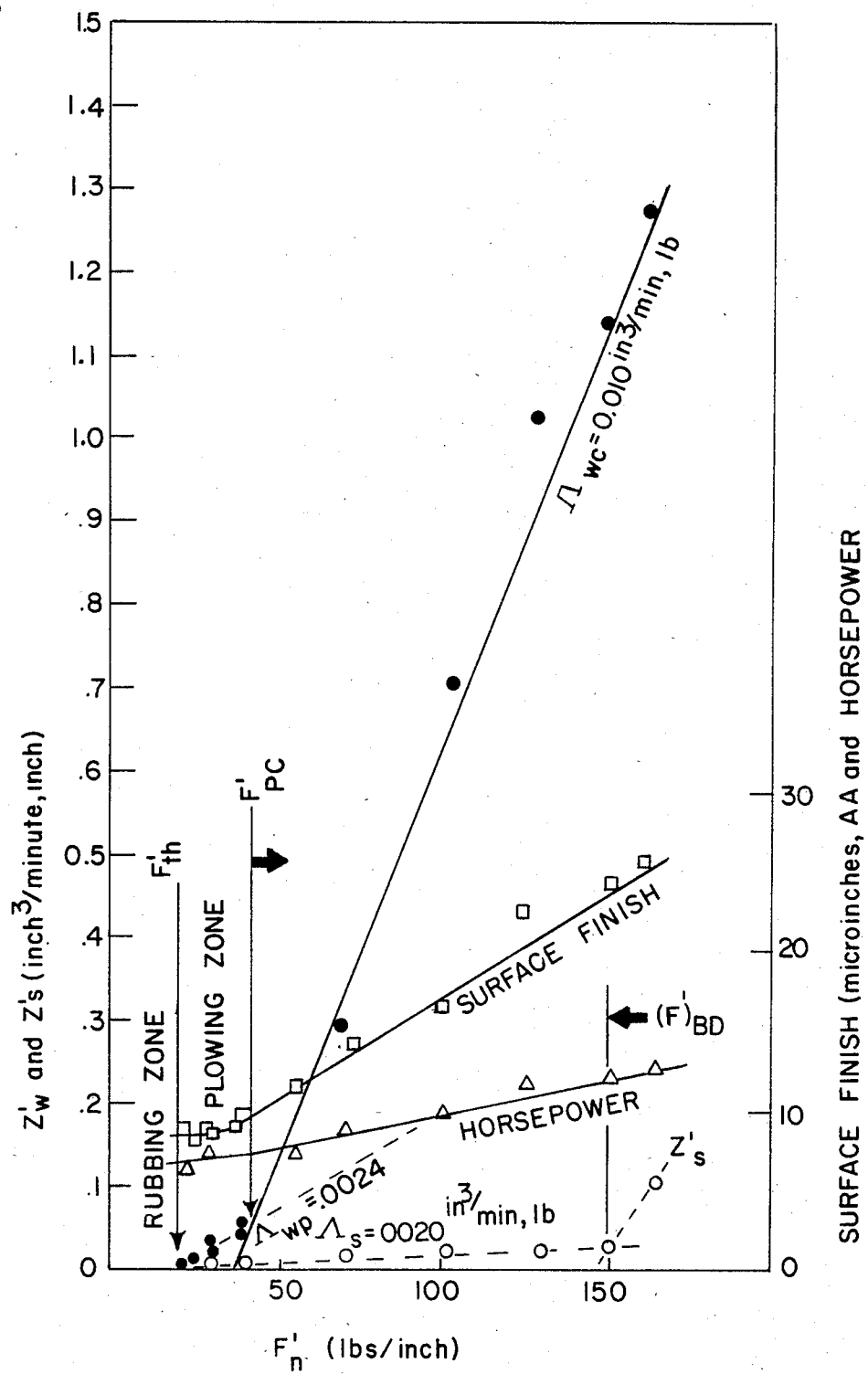
FIG. 18 is a graph of relationships between the important variables in a grinding operation.

FIG. 18 shows how the grinding wheel "machines" the workpiece (curve with solid circles) and how the workpiece "machines" the wheel (curve with open circles). $Z_w'$ and $Z_s'$ are the volumetric removal rates per unit width of contact of the work and wheel respectively. $F_n'$ is the normal interface force per unit width of contact between wheel and work.

The stock removal curve ($Z_w'$ vs $F_n'$ solid circles) shows three zones; a rubbing zone, a plowing zone, and a cutting zone. The force intensity at the onset of the plowing zone is called the "Threshold Force Intensity". The slope of the $Z_w'$ vs $F_n'$ curve in the cutting region is called the "Work Removal Parameter" (WRP=0.010 in $^3$/min*lb). It is used in relating feed rates and induced forces.

The "WHEELWORK CHARACTERISTIC CHART" also shows the force intensity at which the wheel begins to break down rapidly. The wheel-wear curve (open circles) turns up very sharply at FBD, the "BREAKDOWN FORCE INTENSITY". This parameter is calculated by formulas in the program rather than being measured.

The program attempts to set up aggressive grind cycles that will result in high productivity without sacrificing quality. To do this, it calculates the grinding force to stall the wheelhead, to stall the workhead, to break the wheel down and uses the smallest of these to select the rough grinding force and/or feedrate. These forces depend upon the wheelhead power, workhead stall torque, wheel specs, wheel and work diameters and width of cut. Large diameter cuts can easily cause wheel breakdown. High wheel speeds can limit the grind force due to insufficient power.

Figure 19:
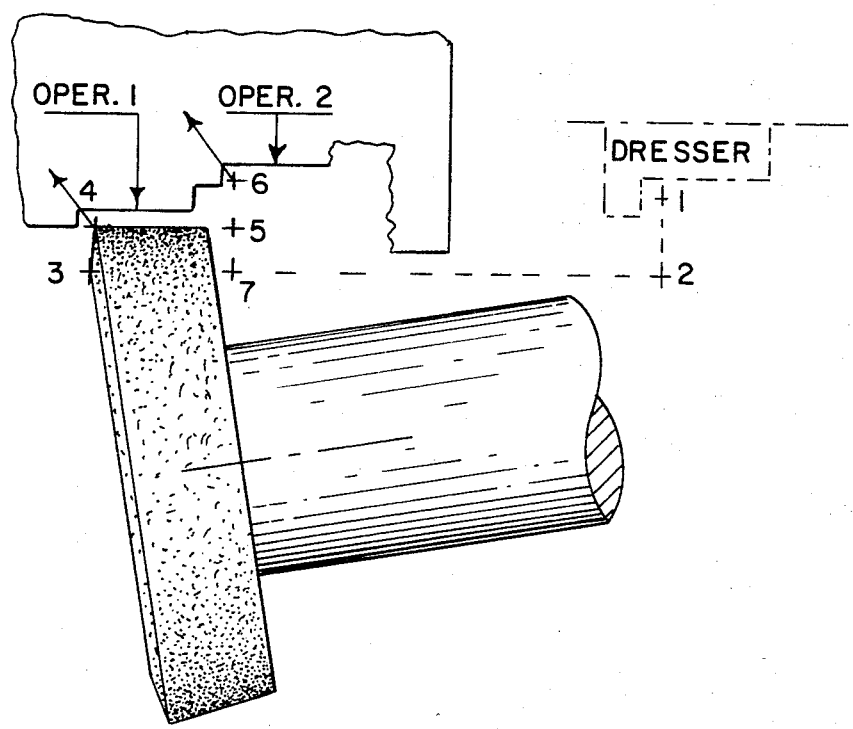
FIG. 19 shows the relationship between a workpiece and an abrasive wheel in a typical grinding operation.

In addition to the computer-generated grinding parameters, the slide movements are also generated by the computer thereby eliminating the detailed programming of point-to-point moves. These slide motions are automatically developed from the input descriptions of the part and wheel geometry. FIG. 19 illustrates a part with two operations which are behind a lip. The program will automatically jump the lip, rapid to Position 3, then to Position 4, from which it does a vector grind for Operation 1, then retracts to Position 4, then looks to see if the next operation uses the same wheelhead and is of the same type (ID or OD); if so, it rapids to Position 5, then to Position 6, from which it does a vector grind for Operation 2. It then retracts to Position 6, then to 7 to jump the lip, then out to 2 and 1—the dress position.

Figure 20:
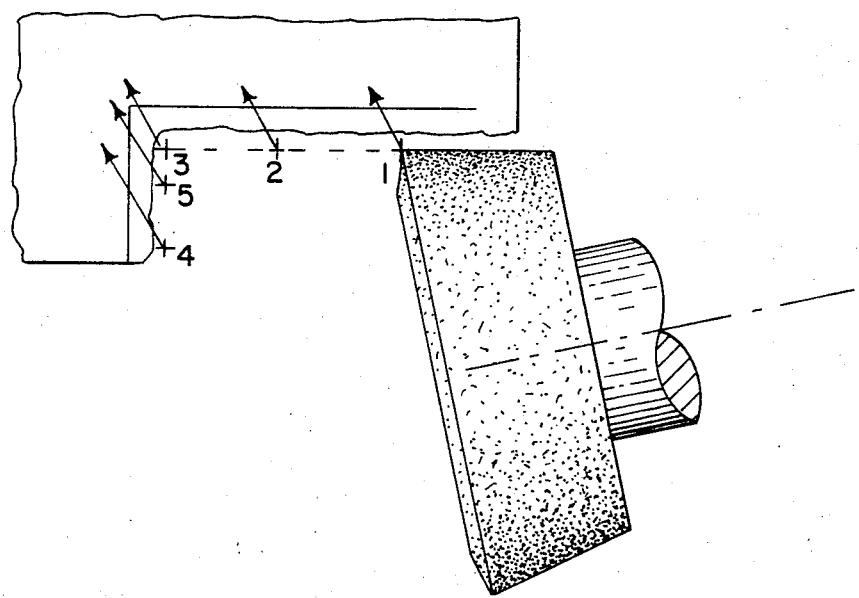
FIG. 20 shows another workpiece being ground by a typical abrasive wheel.
Figure 21:
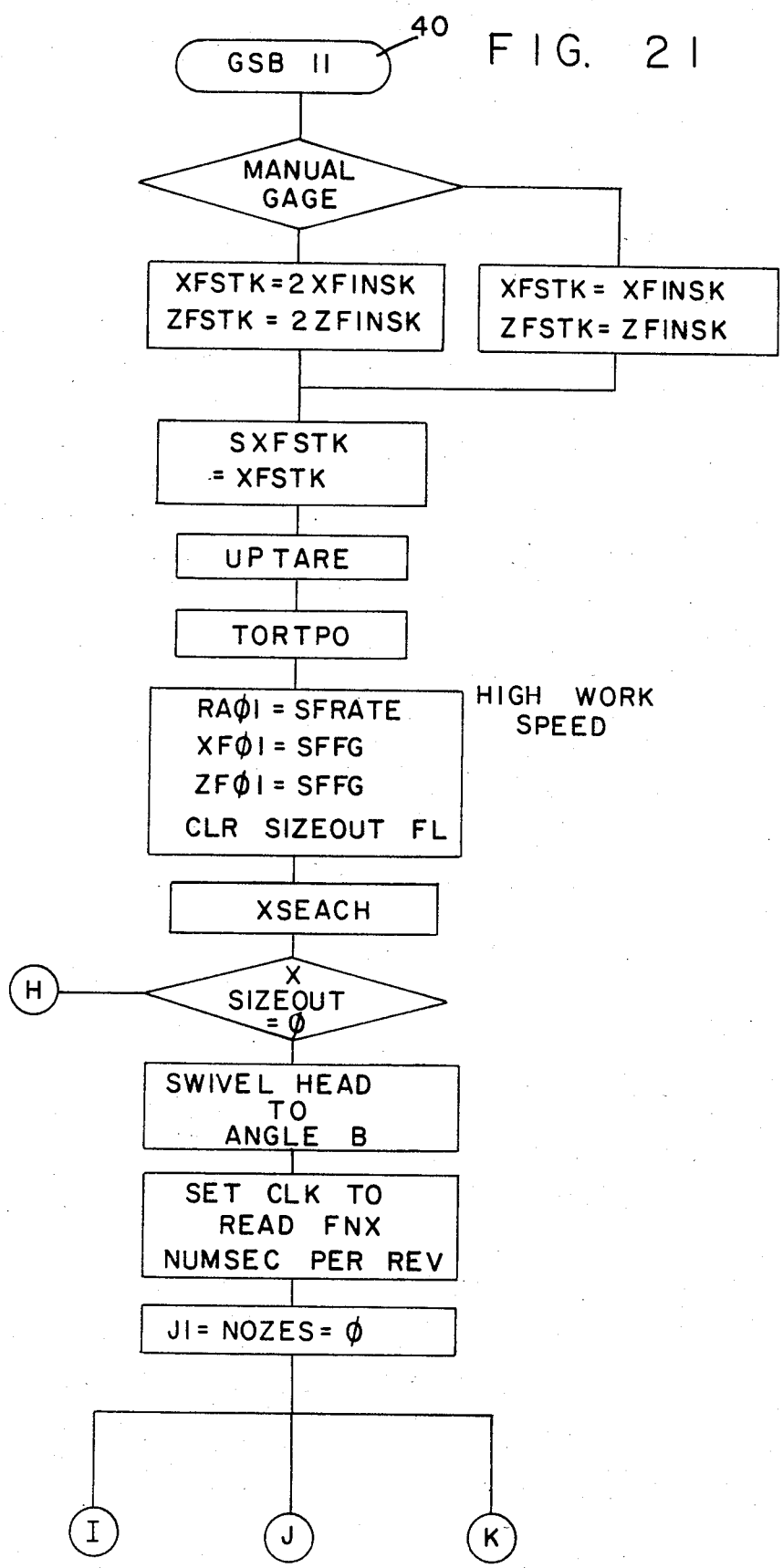
FIGS. 21–29 illustrate a program and sets of routines used in the computer that forms part of the present grinding machine, FIGS. 30, 31, and 32 contain equations of the grinding process.
Figure 22:
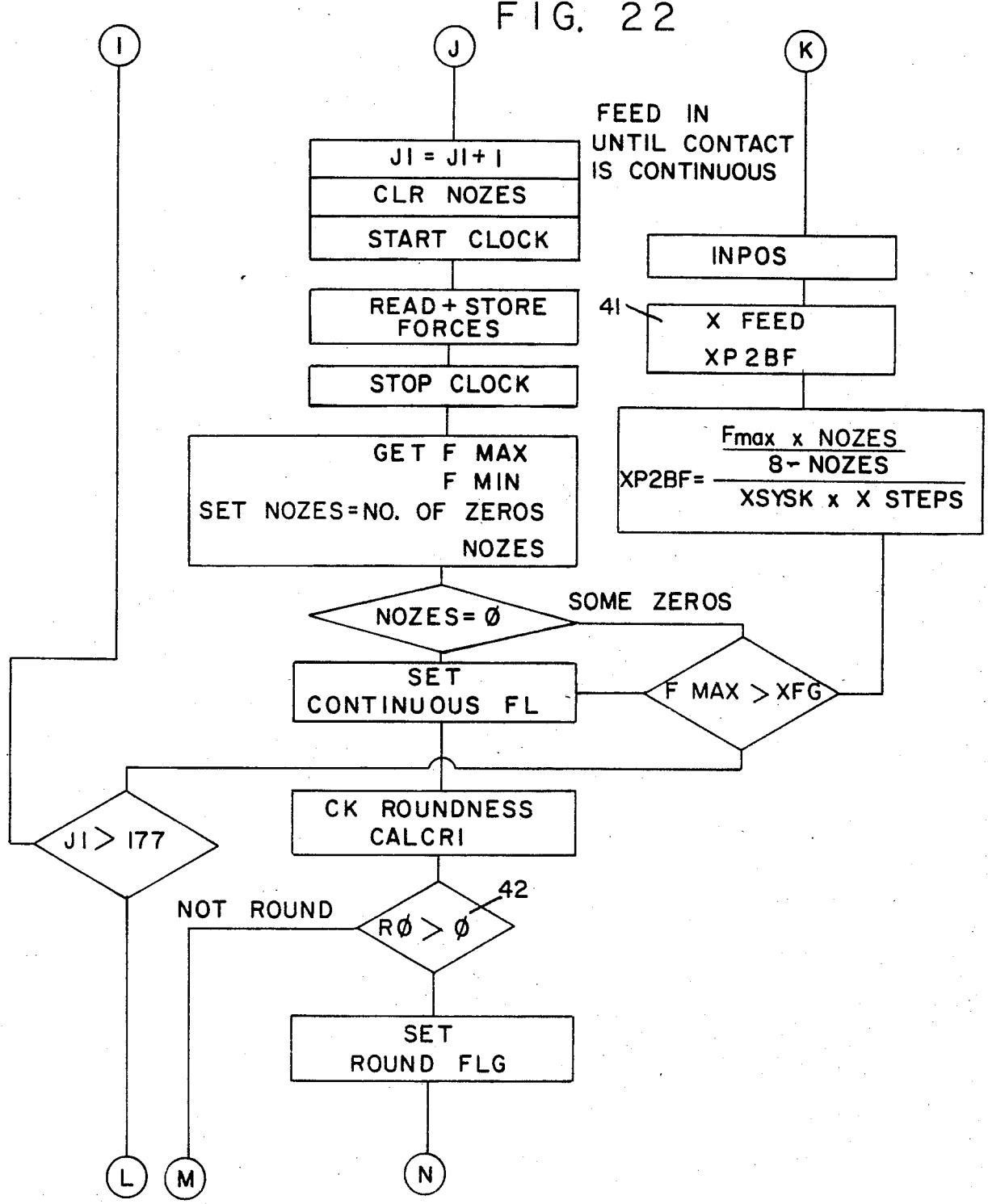
Figure 23:
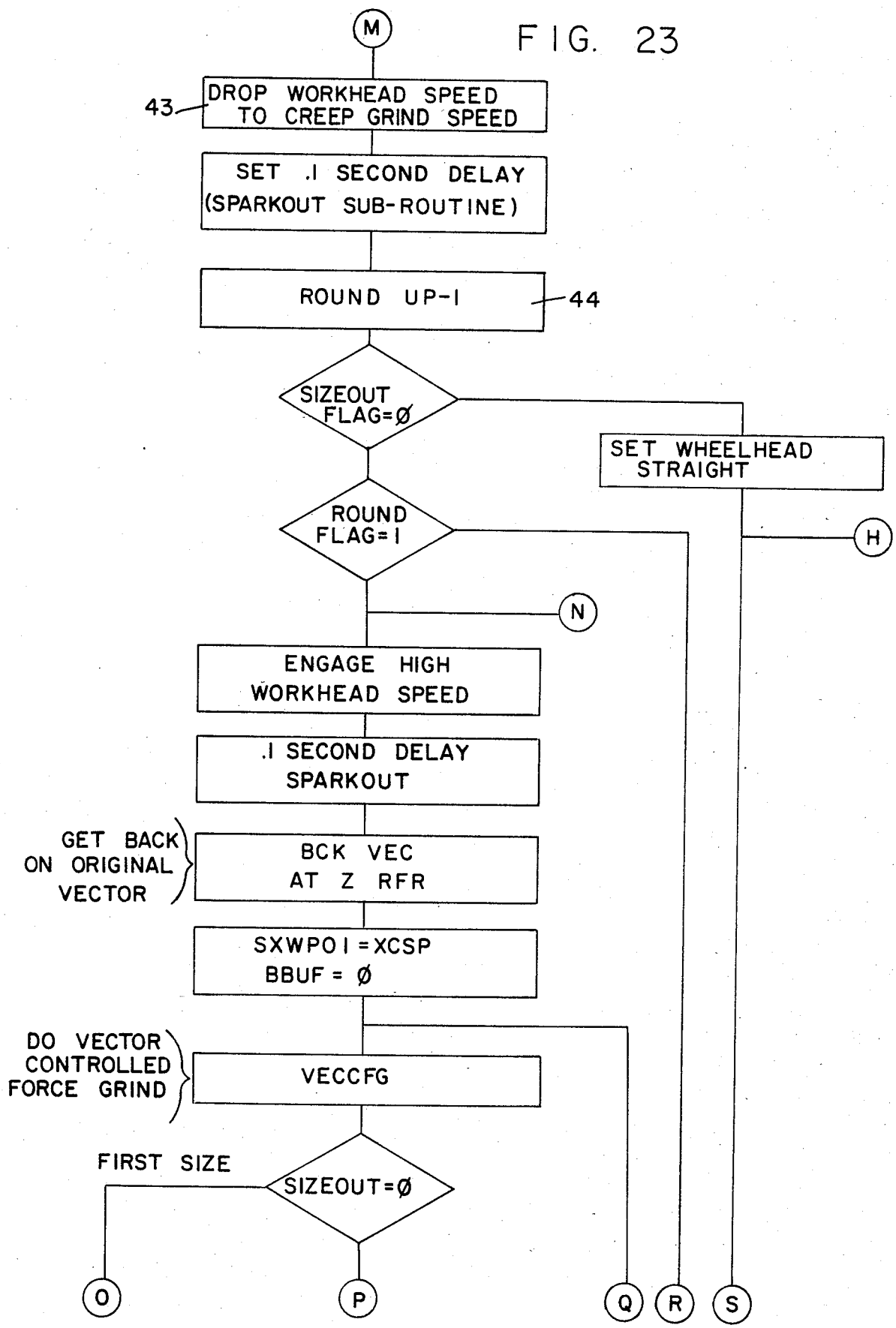
Figure 24:
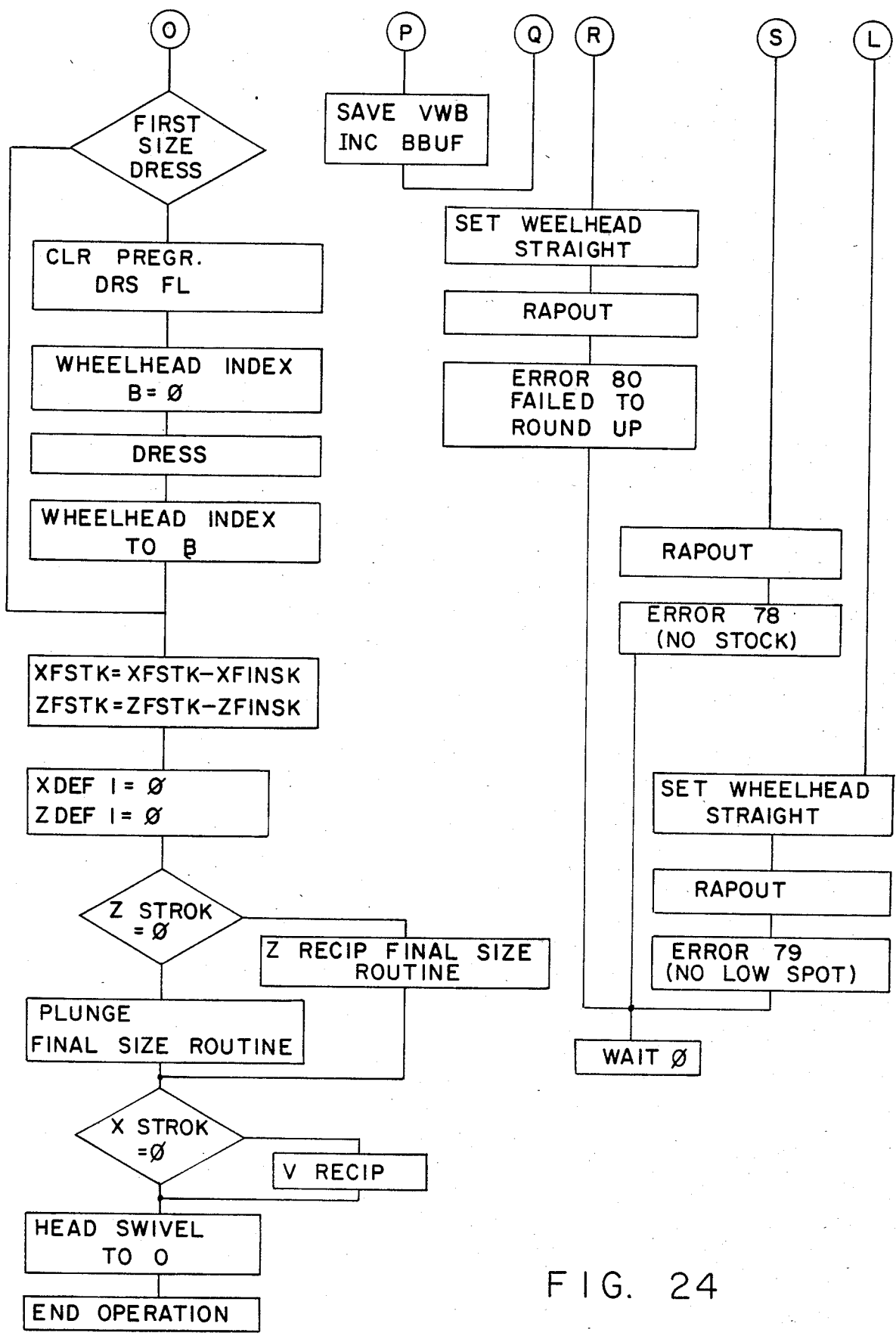
Figure 25:
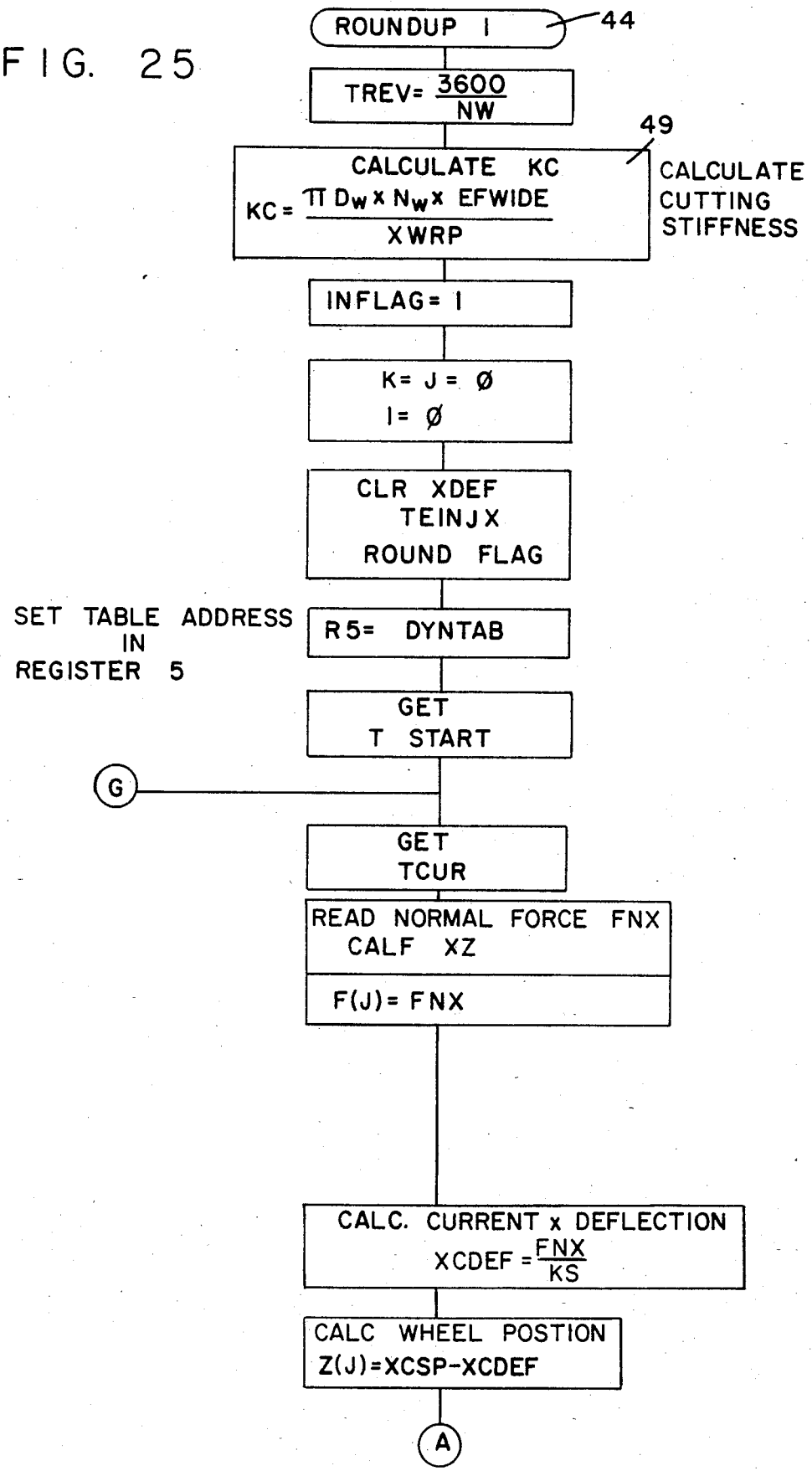
Figure 26:
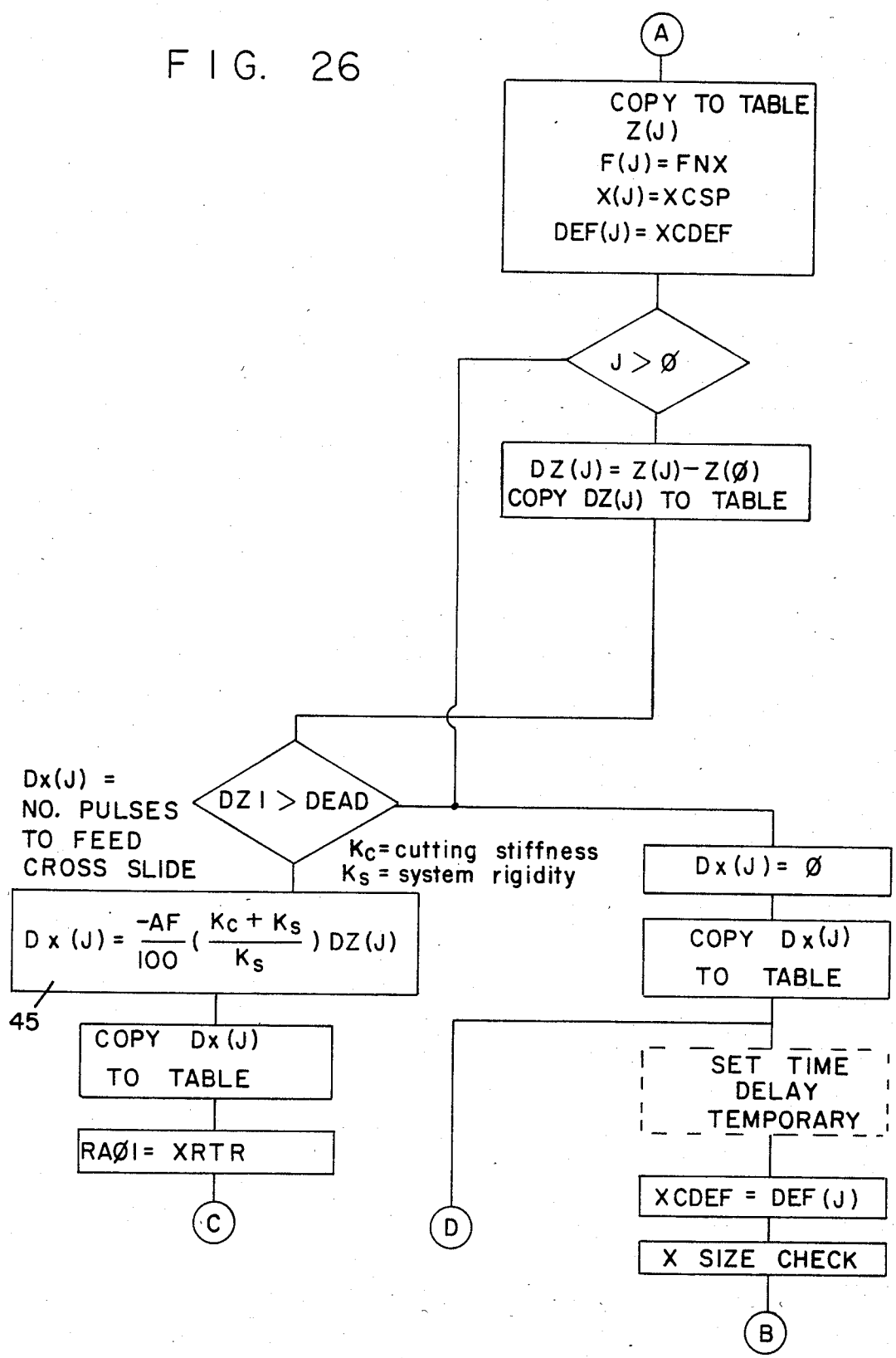
Figure 27:
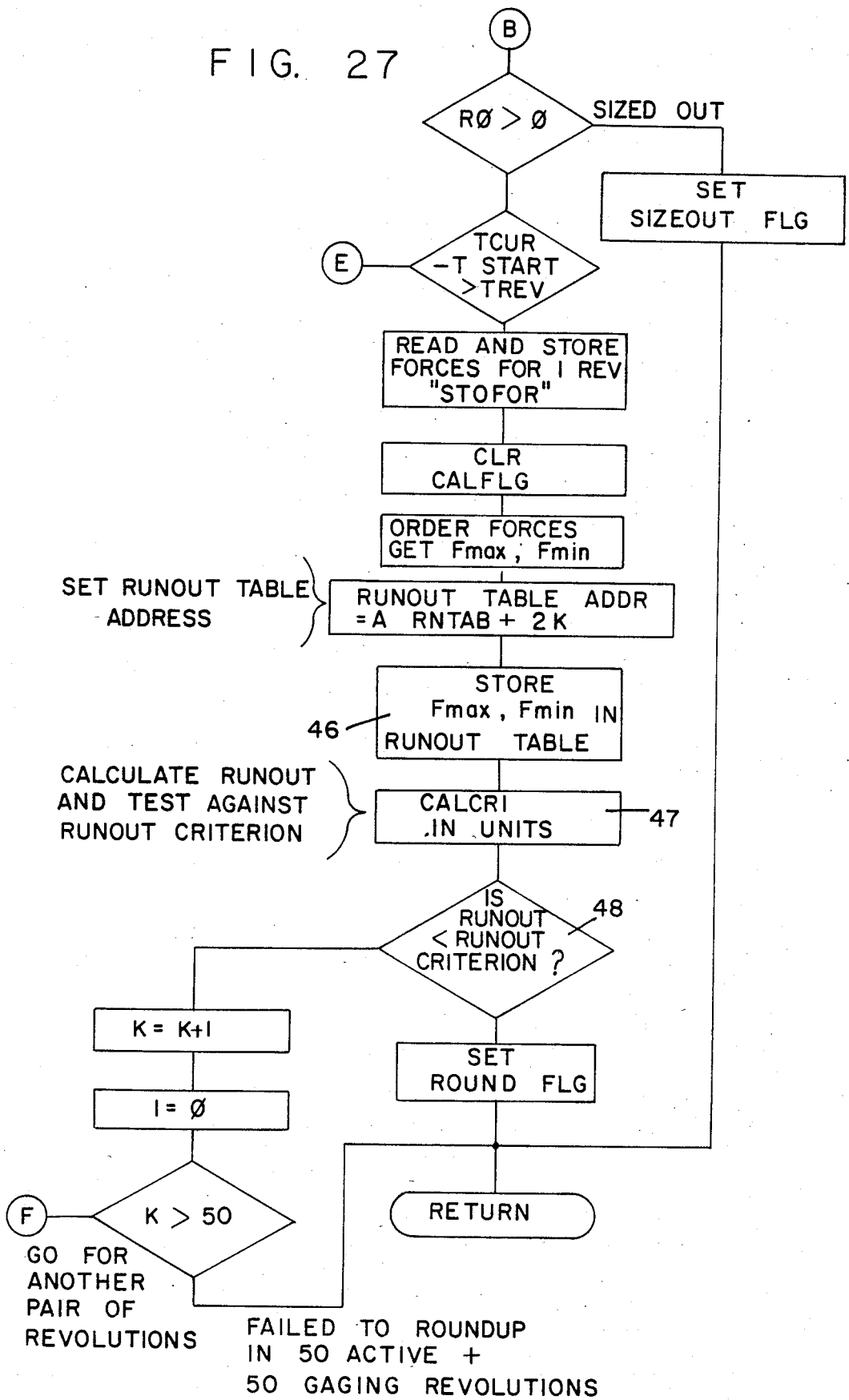
Figure 28:
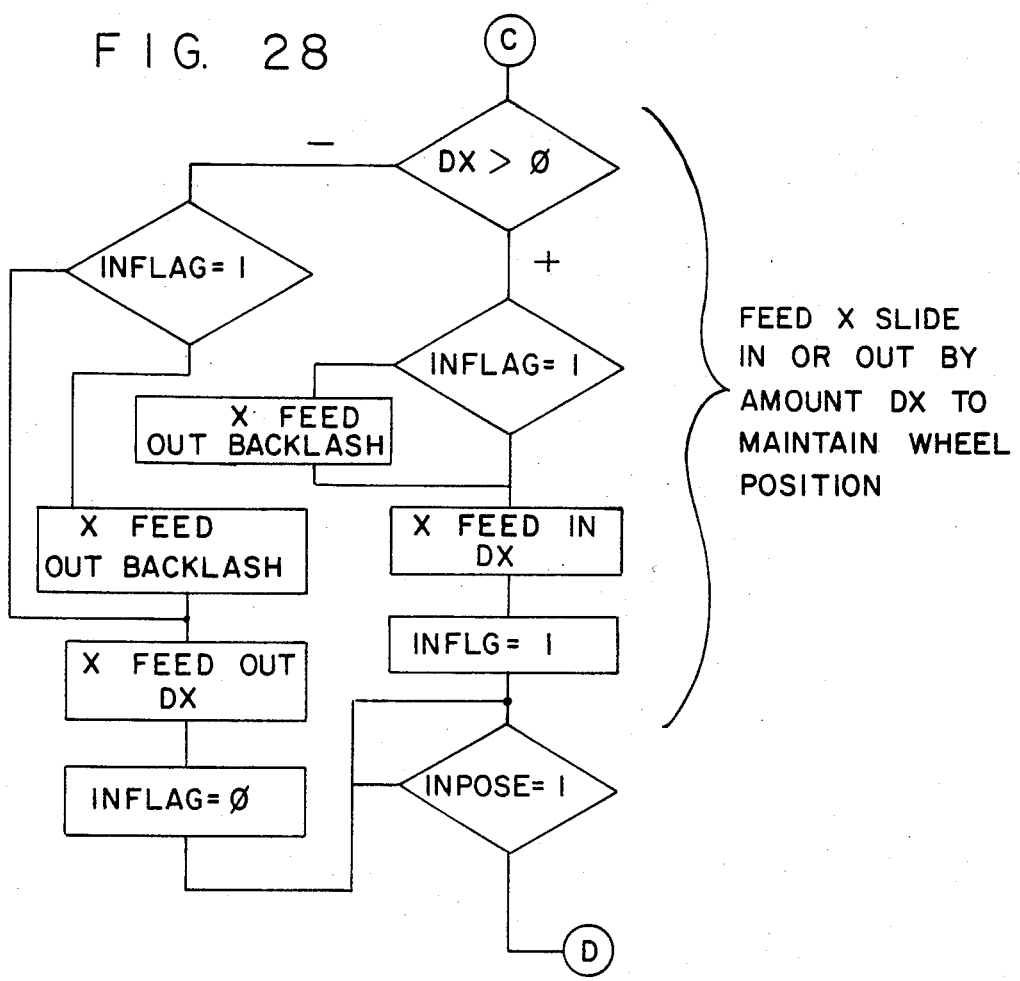
Figure 29:
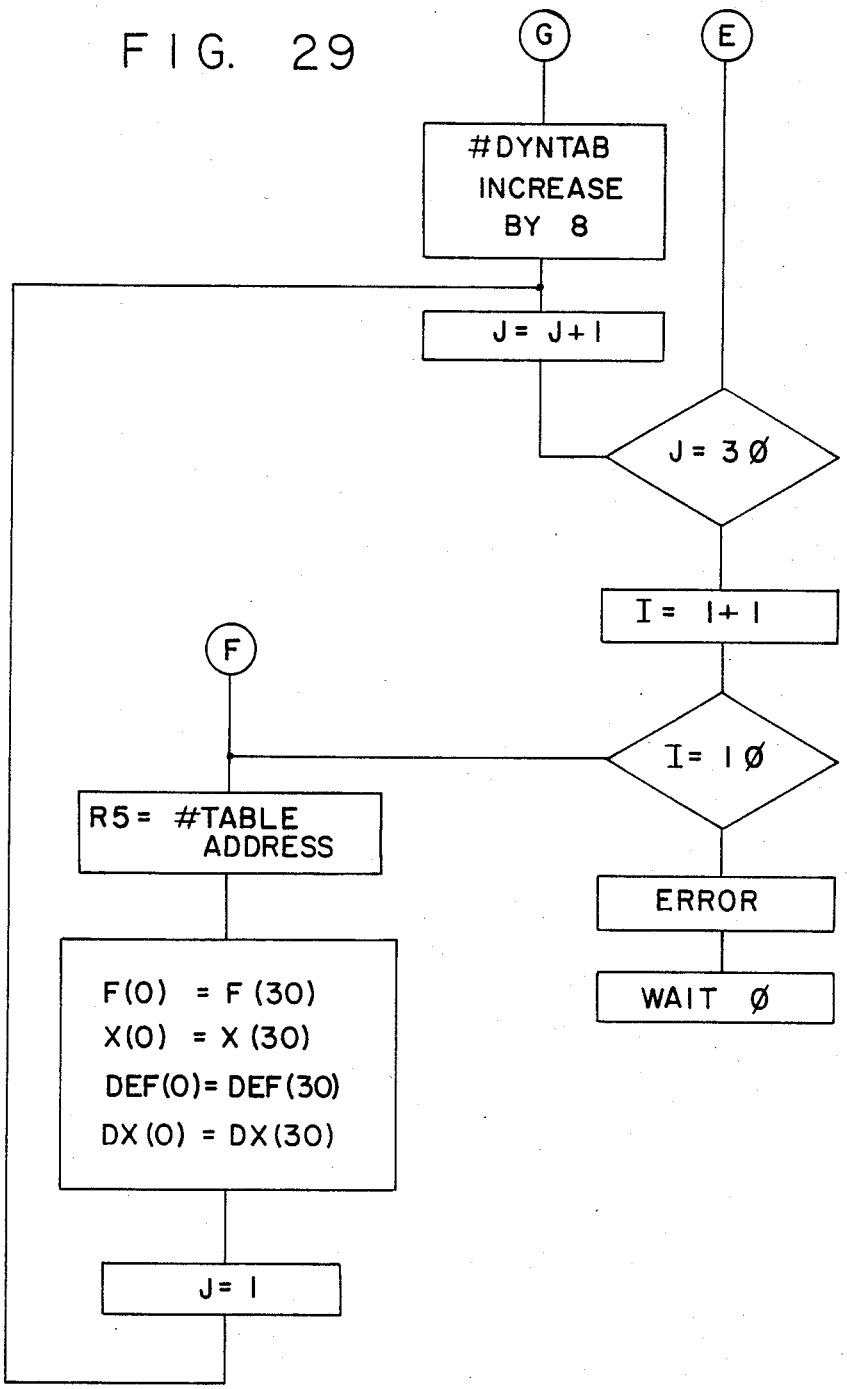

FIG. 20 illustrates another part where the length of bore is longer than the wheel width and where the width of the shoulder is greater than the facing width on the wheel. The computer recognizes these facts and decides to do a series of vector-plunge grinds to 1st size at points 1, 2, and 3. After the bore is rough ground to 1st size, it then does a Z reciprocate grind to final size. The process of performing a series of plunge grinds to rough the bore to 1st size and then of reciprocating is faster than grinding with reciprocation all the way through the rough stock. When the bore is completed, it rapids from Position 3 to Position 4 and then does a series of vector-plunge grinds to 1st size on the face. Following this it does an X reciprocate grind to final size on the face.

These examples illustrate the versatility of the computer and the ease with which part geometries can be programmed.

The present COMPUTER CONTROL provides better control of the important grinding process variables. It permits significant productivity gains both in multioperation, batch-produced parts, as well as in single-operation grinding where cycle time is paramount. The grinding skill requirements of operating personnel are reduced.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Grinding machine for finishing a surface of revolution on a workpiece, comprising:
   (a) a base,
   (b) a workhead mounted on the base for supporting the workpiece and rotating it about the axis of the surface of revolution,
   (c) a wheelhead mounted on the base and having a rotatable spindle which is adapted to carry an abrasive wheel,
   (d) feed means to produce relative movement between the wheelhead and the workhead to produce a grinding cycle between the abrasive wheel and the workpiece,
   (e) a sensor for measuring the force between the wheel and the workpiece at a plurality of time intervals during a revolution of the workpiece and generating a corresponding plurality of analog electrical signals indicative of the said force, including a converter for changing the analog signals to digital signals, and
   (f) a digital computer to which the sensor is connected, the computer being connected to the feed means for the regulation thereof, the computer containing a program for regulating the feed means in such a way that the operative surface of the wheel is maintained at a predetermined forced-independent position during a given creep-feed revolution of the workpiece to perform a rounding up operation, wherein the program contains a routine that causes the computer to actuate the feed means to advance the abrasive wheel toward said surface of the workpiece while the workhead is rotating at high speed until the signal from the sensor indicates that contact is continuous, the program contains a routine that then causes the computer to determine if the said surface of the workpiece is out-of-round and, if it is out-of-round, enters a routine that changes the workhead rotation to a low speed for creep grinding and to progress into a ROUND-UP routine, including a sub-routine causing the feed means to move the wheelhead toward or away from the said surface in accordance with the formula $$DX(J) = \frac{-AF}{100} \frac{(Kc + Ks)}{Ks} DZ(J)$$

where $DX(J)$ is the incremental amount of slide movement, $AF$ is an attenuation factor, $Kc$ is the cutting stiffness, $Ks$ is the system rigidity, and $DZ(J)$ is the calculated change in deflection caused by the measured change in force.

2. Grinding machine as recited in claim 1, wherein the signal of normal force between the wheel and workpiece is transferred from time-to-time from the sensor to the computer, wherein the sub-routine includes a routing in which maximum and minimum forces encountered in a single rotation of the workpiece are determined, wherein the difference between the maximum and minimum forces is determined during each rotation of the workpiece, and wherein a ROUND-UP condition of the workpiece is indicated when the difference is reduced to a predetermined value.

3. Grinding machine as recited in claim 1, wherein the diameter of the surface of revolution is determined and, if a predetermined FIRST SIZE is reached before the said ROUND-UP condition of the workpiece is indicted, the program terminates the grinding operation.

4. Grinding machine for finishing a surface of revolution on a workpiece, comprising:
   (a) a base,
   (b) a workhead mounted on the base for supporting the workpiece and rotating it about the axis of the surface of revolution,
   (c) a wheelhead mounted on the base and having a rotatable spindle which is adapted to carry an abrasive wheel and a motor for rotating the spindle,
   (d) feed means to bring about relative movement between the wheelhead and the workhead to produce a grinding cycle between the abrasive wheel and the workpiece, the feed means including an actuator capable of regulating the distance between the wheelhead and the workhead, and
   (e) control means which operates through the actuator to vary the relative positions of the workhead and wheelhead to maintain the operative surface of the wheel, regardless of varying forces and quill deflection, at a predetermined position relative to the axis of the workpiece during a given revolution of the workpiece to perform a rounding-up operation where large fluctuations in the grinding force would normally cause the operative surface of the wheel to deflect, wherein a dressing apparatus is provided for performing a dressing operation on the abrasive wheel, and wherein means is provided that is operative at a predetermined point in a grinding cycle to measure the abrasive wheel sharpness and to use this value to control the said feed means actuator, wherein a sensor is provided in association with the base for generating an analogue electrical signal indicative of the grinding force between the wheel and the workpiece, including a converter for changing the electrical signal to a digital signal, and wherein the control means includes a digital computer connected to the sensor, the computer being connected to the actuator for the transmittal of signals therebetween for the regulation of the operation of the actuator, wherein any one of a set of similar part programs can be loaded into the active memory of the computer along with a supervisory grinding cycle program, wherein the grinding cycle program includes sub-routines for:
   (a) automatic selection of GRINDING FORCE and/or FEED RATE based on the force that stalls the wheelhead, the workpiece, or destroys the wheel,
   (b) automatic measurement of the SYSTEM RIGIDITY of the base, workhead, wheelhead, spindle, and feed means during operation,
   (c) automatic measurement of the FRESHLY DRESSED WHEEL SHARPNESS during the initial setup grinding operation, and automatic measurement of the CURRENT WHEEL SHARPNESS during subsequent grinding operations and comparison with the FRESHLY DRESSED WHEEL SHARPNESS,
   (d) automatic regulation of a NEW WHEEL DRESSING operation, for dressing each new wheel to a predetermined diameter immediately after it is mounted on the spindle, (e) regulation of a MANUAL GAGING operation in which a gage measures the diameter of the surface of revolution of a dummy workpiece, (f) regulation of a DEFLECTION COMPENSATED ROUNDUP operation in which the control means operates to maintain the abrasive wheel at a predetermined position in spite of varying forces on the wheel, (g) calculation of WHEEL WEAR FACTOR indicative of the wear on the abrasive wheel, (h) calculation of EXCESS WHEEL WEAR by which wear on the abrasive wheel exceeds a predetermined value, (i) calculation of the FINISH FEED RATE required to produce a desired surface finish, (j) execution of a THRESHOLD HUNT operation to determine the threshold grinding force, (k) execution of a COMPENSATION operation such that the amount of compensation is varied to produce a constant depth of dress, (l) operation of a ROUND-UP MONITORING routine to indicate whether round-up can be completed before final size is reached, (m) calcuation of the position of the operative surface of the wheel at final size, by use of a SIZING EQUATION to compensate for deflections, wheelwear and the thermal expansion, (n) automatically changing the grinding cycle parameters as the ratio of wheel diameter to work diameter changes, and (o) automatically measuring the runout during a grinding cycle and comparison with a prescribed acceptable runout limit.

5. A grinding machine as recited in claim 4, wherein the feed means includes an actuator capable of regulating the distance between the wheel and the workpiece, and wherein the sub-routine for selection of the amount of regulation operates to select the lowest value of normal force between the highest normal force that can be produced with the horsepower available from the said wheelhead motor, on the one hand, and the highest force that can be used without destruction of the abrasive wheel, on the other hand, and without stalling workhead or exceeding other force constraints.

6. A grinding machine as recited in claim: 4, wherein the means obtaining a measurement of the system rigidity of the system, including the base, wheelhead, workhead, spindle, and feed means, uses this measurement to calculate the system deflection and thereby control the said feed means, to eliminate size errors due to variable deflections of the wheel-work system.

7. A grinding machine as recited in claim 4, wherein a dressing apparatus is provided wherein means is operative at a predetermined point in a grinding cycle to measure the current wheel sharpness and to use this value to control the said feed means, and wherein the wheel sharpness is measured at other times in other cycles and compared with the said current wheel sharpness for making a decision to execute a dressing operation.

8. A grinding machine as recited in claim 4, wherein a dresser is mounted for engagement on occasion with the wheel, and wherein the NEW WHEEL DRESSING operation acts when a new wheel is mounted on the spindle to produce a special dressing cycle where the computer automatically discovers the cross-slide position at dress, and sets rapid traverse distance automatically.

9. A grinding machine as recited in claim 4, wherein the control means provides an interactive procedure at set up time to determine a final size position of the operative surface of the wheel, regardless of wheel-work deflections and storing this information for use with the feed means in subsequent grinding cycles.

10. A grinding machine as recited in claim 4, wherein a dresser is mounted for contact on occasion with the wheel, wherein the feed means uses electrical pulses to produce the relative movement between the wheelhead and the workhead, and wherein means is operative after a rough grind portion of the cycle and during a dressing operation to measure the wheel wear and to use that measurement to determine a wheel wear factor, for use in calculating the current wheel wear in subsequent grinding operations.

11. A grinding machine as recited in claim 4, wherein the control means is operative during a grind cycle to calculate the WHEEL WEAR and to modify the sizing position of the cross-slide accordingly.

12. A grinding machine as recited in claim 4, wherein the THRESHOLD HUNT operation consists of means for continuously measuring the rate of stock removal from the surface of revolution workpiece, and means for increasing the ginding force in increments until a force is reached such that the rate of stock removal exceeds a certain value.

13. A grinding machine as recited in claim 4, wherein the ROUND-UP MONITORING routine is carried out in conjuction with means for continuously measuring the degree of out-of-round condition of the workpiece surface, means for continuously determining the amount of stock to be removed from the surface of revolution workpiece before final size, and means terminating the grinding cycle if it appears that insufficient stock remains to enable the reduction of the out-of-round condition to a predetermined level.

14. A grinding machine as recited in claim 4, wherein the SIZING EQUATION makes use of the final size position set during a SET UP PROCEDURE, the amount of wheelwear since the immediately previous dressing operation and the amount of spindle deflection as determined from a measurement of grinding force.

* * * * *